US012795347B2

(12) United States Patent
Kim et al.

(10) Patent No.: US 12,795,347 B2
(45) Date of Patent: Nov. 10, 2026

(54) INTELLIGENT SUBSCRIBER IDENTITY MODULE (SIM) SWITCHING

(71) Applicant: Boost SubscriberCo L.L.C., Englewood, CO (US)

(72) Inventors: In-Kyung Kim, Highlands Ranch, CO (US); Eric Hieb, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 209 days.

(21) Appl. No.: 18/357,535

(22) Filed: Jul. 24, 2023

(65) Prior Publication Data

US 2024/0147216 A1 May 2, 2024

Related U.S. Application Data

(60) Provisional application No. 63/421,119, filed on Oct. 31, 2022.

(51) Int. Cl.

| | |
|---|---|
| ***H04W 8/18*** | (2009.01) |
| ***H04W 8/02*** | (2009.01) |
| ***H04W 88/06*** | (2009.01) |

(52) U.S. Cl.

CPC ............ *H04W 8/183* (2013.01); *H04W 8/02* (2013.01); *H04W 88/06* (2013.01)

(58) Field of Classification Search

CPC ................................ H04W 8/02; H04W 88/06
USPC ...................................................... 455/432.1
See application file for complete search history.

(56) References Cited

U.S. PATENT DOCUMENTS

| | | | |
|---|---|---|---|
| 4,423,287 | A | 12/1983 | Zeidler |
| 6,073,139 | A | 6/2000 | Jain et al. |
| 6,832,089 | B2 | 12/2004 | Jean Henry-Labordere |
| 7,631,331 | B2 | 12/2009 | Sie et al. |
| 7,877,511 | B1 | 1/2011 | Berger et al. |
| 7,930,716 | B2 | 4/2011 | Liga et al. |
| 7,958,029 | B1 | 6/2011 | Bobich et al. |
| 8,352,981 | B1 | 1/2013 | Oztaskent |
| 8,468,056 | B1 | 6/2013 | Chalawsky |
| 8,516,119 | B2 | 8/2013 | Banger et al. |

(Continued)

FOREIGN PATENT DOCUMENTS

| | | | |
|---|---|---|---|
| CN | 102143474 | A | 8/2011 |
| CN | 111970686 | A | 11/2020 |

(Continued)

OTHER PUBLICATIONS

Bei et al., "Network Switch Systems and Methods," U.S. Appl. No. 18/812,899, filed Aug. 22, 2024.

(Continued)

*Primary Examiner* — Fabricio R Murillo Garcia

(74) *Attorney, Agent, or Firm* — Christopher Wickstrom; Fronter IP Law PLLC

(57) ABSTRACT

Intelligent subscriber identity module (SIM) switching for user equipment (UE) devices is disclosed. The UE may have multiple SIMs for multiple carrier networks (i.e., mobile network operators (MNOs) that provide wireless network infrastructure, such as radio access networks (RANs)) or a universal SIM. It may be desirable to switch between SIMs for various reasons, such as based on network quality criteria, subscription criteria, agreement criteria between MNOs, etc. These criteria may inform a policy for determining which SIM to use.

20 Claims, 13 Drawing Sheets

(56) References Cited

U.S. PATENT DOCUMENTS 8,799,943 B1 8/2014 Sherwin et al.
8,855,107 B1 10/2014 Kirchhoff et al.
9,066,138 B1 6/2015 Kraiman et al.
9,106,606 B1 8/2015 Hasson et al.
9,369,544 B1 6/2016 Morgan et al.
9,510,025 B1 11/2016 Einarsson et al.
9,521,437 B2 12/2016 Sellers et al.
9,661,380 B2 5/2017 Major et al.
9,763,093 B2 9/2017 Richards et al.
9,848,249 B2 12/2017 Freed et al.
10,171,514 B2 1/2019 Ramachandran et al.
10,334,428 B1 6/2019 Chen et al.
10,638,310 B2 4/2020 Subramaniam
10,645,196 B1 5/2020 Sharipov et al.
10,708,759 B1 7/2020 Roy et al.
10,716,021 B1 7/2020 Peden et al.
10,904,639 B1 1/2021 Benson et al.
10,945,048 B2 3/2021 Major et al.
11,082,839 B2 8/2021 Jacobson et al.
11,172,269 B2 11/2021 Major
11,178,215 B1 11/2021 Kaukl et al.
11,178,469 B2 11/2021 Major
11,533,611 B2 12/2022 Berard et al.
11,632,714 B2 4/2023 Opsenica et al.
11,641,579 B1 5/2023 Mukherjee et al.
11,659,259 B1 5/2023 Pressnell et al.
11,871,050 B1 1/2024 Koceski et al.
12,602,354 B1 4/2026 Camp et al.
2002/0144262 A1 10/2002 Plotnick et al.
2002/0177438 A1 11/2002 Sakai et al.
2003/0093709 A1 5/2003 Ogawa et al.
2004/0128682 A1 7/2004 Liga et al.
2004/0189873 A1 9/2004 Konig et al.
2005/0079855 A1 4/2005 Jethi et al.
2005/0192035 A1 9/2005 Jiang
2005/0204381 A1 9/2005 Ludvig et al.
2006/0253864 A1 11/2006 Easty
2007/0155382 A1 7/2007 Jiang
2007/0157228 A1 7/2007 Bayer et al.
2007/0174491 A1 7/2007 Still et al.
2007/0191011 A1 8/2007 Jiang
2007/0192772 A1 8/2007 De Bonet
2007/0201361 A1 8/2007 Kumar et al.
2007/0203880 A1 8/2007 Kumar et al.
2007/0219859 A1 9/2007 Huntington
2008/0085707 A1 4/2008 Fadell
2008/0092150 A1 4/2008 Jethi et al.
2008/0132226 A1 6/2008 Carnall
2008/0167853 A1 7/2008 Fernsler et al.
2008/0176535 A1 7/2008 Cai
2008/0216157 A1 9/2008 Huuhtanen et al.
2008/0260161 A1 10/2008 Yokota et al.
2009/0017809 A1 1/2009 Jethi et al.
2009/0025026 A1 1/2009 Mick et al.
2009/0077201 A1 3/2009 Nakamura et al.
2009/0077580 A1 3/2009 Konig et al.
2009/0086726 A1 4/2009 Savage et al.
2009/0191857 A1 7/2009 Horn et al.
2009/0193129 A1 7/2009 Agarwal et al.
2009/0304358 A1 12/2009 Rashkovskiy et al.
2010/0014594 A1 1/2010 Beheydt et al.
2010/0017861 A1 1/2010 Krishnaswamy et al.
2010/0083305 A1 4/2010 Acharya et al.
2010/0131659 A1 5/2010 Narayana et al.
2010/0269128 A1 10/2010 Gordon
2010/0325657 A1 12/2010 Sellers et al.
2011/0026501 A1 2/2011 Sharaga et al.
2011/0099467 A1 4/2011 Kapur et al.
2011/0194838 A1 8/2011 Meijer
2011/0197224 A1 8/2011 Meijer
2011/0270653 A1 11/2011 Gupta et al.
2011/0276323 A1 11/2011 Seyfetdinov
2011/0296458 A1 12/2011 Di et al.
2012/0099022 A1 4/2012 Sundy et al.
2012/0124618 A1 5/2012 Ruiz-Velasco et al.
2012/0147824 A1 6/2012 Van et al.
2012/0166289 A1 6/2012 Gadoury et al.
2012/0185561 A1 7/2012 Klein et al.
2012/0192222 A1 7/2012 Kumar et al.
2012/0230652 A1 9/2012 Mirsky et al.
2012/0275442 A1 11/2012 Malets et al.
2012/0317261 A1 12/2012 Ahmavaara
2013/0072257 A1 3/2013 Evans et al.
2013/0086631 A1 4/2013 Archer et al.
2013/0139235 A1 5/2013 Counterman
2013/0238745 A1 9/2013 Ramachandran et al.
2013/0262404 A1 10/2013 Daga et al.
2013/0311546 A1 11/2013 Fischer et al.
2013/0336210 A1 12/2013 Connor et al.
2013/0336337 A1 12/2013 Gopinath et al.
2014/0020013 A1 1/2014 Dilorenzo
2014/0051417 A1 2/2014 Wuerch et al.
2014/0082659 A1 3/2014 Fife et al.
2014/0115631 A1 4/2014 Mak
2014/0150019 A1 5/2014 Ma et al.
2014/0249937 A1 9/2014 McNally
2014/0273944 A1 9/2014 Ramprasad
2014/0274034 A1 9/2014 Trapp
2014/0298037 A1 10/2014 Xiao et al.
2014/0342776 A1 11/2014 Viswanadham et al.
2015/0019199 A1 1/2015 Andrews et al.
2015/0032547 A1 1/2015 Malhotra
2015/0189615 A1 7/2015 Rembarz et al.
2015/0302487 A1 10/2015 Reynolds
2015/0319479 A1 11/2015 Mishra et al.
2015/0334646 A1 11/2015 Buckley et al.
2015/0339634 A1 11/2015 Xiao et al.
2015/0339722 A1 11/2015 Hensgen et al.
2015/0349824 A1 12/2015 Cho et al.
2015/0381593 A1 12/2015 Low et al.
2016/0149605 A1 5/2016 Vecera et al.
2016/0183081 A1 6/2016 Flores Cuadrado et al.
2016/0192240 A1 6/2016 Duan
2016/0285822 A1 9/2016 Adams
2016/0306965 A1 10/2016 Iyer et al.
2016/0316070 A1 10/2016 Bobich et al.
2016/0316233 A1 10/2016 Ghadi et al.
2016/0323193 A1 11/2016 Zhou et al.
2017/0031574 A1 2/2017 Dhawal
2017/0048566 A1 2/2017 Srinivasan
2017/0048773 A1 2/2017 Miao et al.
2017/0078715 A1 3/2017 Chao
2017/0094370 A1 3/2017 Jankowski
2017/0188115 A1 6/2017 Bafekr
2017/0201876 A1 7/2017 Tamagawa
2017/0208369 A1 7/2017 Major et al.
2017/0223598 A1 8/2017 Ho et al.
2017/0264592 A1 9/2017 Yoda et al.
2017/0264951 A1 9/2017 Mitra et al.
2017/0310411 A1 10/2017 Dillon et al.
2018/0040011 A1 2/2018 Milton
2018/0084504 A1 3/2018 Lindoff et al.
2018/0167853 A1 6/2018 Wang
2018/0189276 A1 7/2018 Fonseca, Jr. et al.
2018/0255132 A1 9/2018 Yasukawa et al.
2018/0285372 A1 10/2018 Dosovitsky et al.
2018/0310238 A1 10/2018 Opsenica et al.
2018/0331974 A1 11/2018 He et al.
2018/0359540 A1 12/2018 Major
2019/0007082 A1 1/2019 Dumoulin et al.
2019/0075344 A1 3/2019 Brown
2019/0115950 A1 4/2019 Kakinada et al.
2019/0132630 A1 5/2019 Loheide et al.
2019/0191282 A1* 6/2019 Sanyal ................ H04W 88/184
2019/0200065 A1 6/2019 Haberman et al.
2019/0230501 A1 7/2019 He et al.
2019/0253836 A1 8/2019 Sinha et al.
2019/0313135 A1 10/2019 Pathak et al.
2020/0051161 A1 2/2020 Dylla
2020/0084614 A1 3/2020 Xu
2020/0100097 A1* 3/2020 Zheng .................. H04W 88/14
2020/0186862 A1 6/2020 Garner et al.
2020/0213673 A1 7/2020 Major et al.
2020/0311096 A1 10/2020 Murthy

(56) References Cited

U.S. PATENT DOCUMENTS

| | | | |
|---|---|---|---|
| 2021/0006656 | A1 | 1/2021 | Gramacho et al. |
| 2021/0021704 | A1 | 1/2021 | Arutyunyan et al. |
| 2021/0092568 | A1 | 3/2021 | Namiranian |
| 2021/0096825 | A1 | 4/2021 | Gray et al. |
| 2021/0112382 | A1 | 4/2021 | Oswal et al. |
| 2021/0152598 | A1 | 5/2021 | Kapelevich et al. |
| 2021/0174715 | A1 | 6/2021 | Holloway et al. |
| 2021/0176820 | A1 | 6/2021 | Zhang et al. |
| 2021/0195392 | A1 | 6/2021 | Kojima et al. |
| 2021/0203719 | A1 | 7/2021 | Miyagi |
| 2021/0250430 | A1 | 8/2021 | Moon |
| 2021/0281924 | A1 | 9/2021 | Karuppiah et al. |
| 2021/0282127 | A1 | 9/2021 | Chaudhary et al. |
| 2021/0297941 | A1 | 9/2021 | Brown et al. |
| 2022/0022014 | A1 | 1/2022 | Li et al. |
| 2022/0053607 | A1 | 2/2022 | Rice et al. |
| 2022/0078514 | A1 | 3/2022 | Bustamante et al. |
| 2022/0086532 | A1 | 3/2022 | Major |
| 2022/0150686 | A1 | 5/2022 | Nitsch |
| 2022/0171983 | A1 | 6/2022 | Chen et al. |
| 2022/0182688 | A1 | 6/2022 | Sharma et al. |
| 2022/0256237 | A1 | 8/2022 | Grover |
| 2022/0263825 | A1 | 8/2022 | Gregus et al. |
| 2022/0286839 | A1 | 9/2022 | Zhao et al. |
| 2022/0291851 | A1 | 9/2022 | Tylik et al. |
| 2022/0295343 | A1 | 9/2022 | Pefkianakis et al. |
| 2022/0321931 | A1 | 10/2022 | Panje et al. |
| 2022/0368441 | A1 | 11/2022 | Lee |
| 2022/0369094 | A1 | 11/2022 | Rajwar et al. |
| 2023/0030905 | A1* | 2/2023 | Mao ...................... H04W 8/183 |
| 2023/0084923 | A1 | 3/2023 | Hieb et al. |
| 2023/0107904 | A1 | 4/2023 | Wang et al. |
| 2023/0359760 | A1 | 11/2023 | Karia et al. |
| 2023/0362583 | A1 | 11/2023 | Tawhidur |
| 2023/0385561 | A1 | 11/2023 | Kennedy, Jr. |
| 2023/0396979 | A1 | 12/2023 | Kanchiraju et al. |
| 2023/0421469 | A1 | 12/2023 | Bhattacharjee |
| 2024/0015806 | A1* | 1/2024 | Kahn .................. H04W 12/069 |
| 2024/0031356 | A1 | 1/2024 | Jiang |
| 2024/0040497 | A1 | 2/2024 | Ohno |
| 2024/0073674 | A1 | 2/2024 | Chughtai et al. |
| 2024/0098504 | A1* | 3/2024 | Demonget ............ H04W 8/183 |
| 2024/0121835 | A1 | 4/2024 | Kawakami et al. |
| 2024/0129713 | A1 | 4/2024 | Mikuni et al. |
| 2024/0147215 | A1 | 5/2024 | Kim et al. |
| 2024/0155327 | A1 | 5/2024 | Liu |
| 2024/0188067 | A1 | 6/2024 | Zhang et al. |
| 2024/0204978 | A1 | 6/2024 | Eldar et al. |
| 2024/0224020 | A1 | 7/2024 | Haswarey et al. |
| 2024/0224024 | A1 | 7/2024 | Mukherjee et al. |
| 2024/0244417 | A1 | 7/2024 | Wendeborn et al. |
| 2024/0251230 | A1 | 7/2024 | Gupta |
| 2024/0256797 | A1 | 8/2024 | Chollampatt Muhammed Ashraf et al. |
| 2024/0259783 | A1 | 8/2024 | Hegde et al. |
| 2024/0273570 | A1 | 8/2024 | Bender et al. |
| 2024/0284165 | A1 | 8/2024 | Li |
| 2024/0305598 | A1 | 9/2024 | Narayan et al. |
| 2024/0305961 | A1 | 9/2024 | Simon et al. |
| 2024/0370903 | A1 | 11/2024 | Ditullio et al. |
| 2024/0373078 | A1 | 11/2024 | Offeman et al. |
| 2024/0406469 | A1 | 12/2024 | Millar et al. |
| 2025/0028525 | A1 | 1/2025 | Allen |
| 2025/0142318 | A1 | 5/2025 | Eldar |
| 2025/0209396 | A1 | 6/2025 | Thakur et al. |
| 2025/0238372 | A1 | 7/2025 | Shveidel et al. |
| 2025/0267461 | A1 | 8/2025 | Eriksson |
| 2025/0274825 | A1 | 8/2025 | Eldar et al. |
| 2025/0279942 | A1 | 9/2025 | Eldar et al. |
| 2025/0280284 | A1 | 9/2025 | Eldar et al. |
| 2025/0280327 | A1 | 9/2025 | Eldar et al. |
| 2025/0284985 | A1 | 9/2025 | Shirrell et al. |
| 2025/0324137 | A1 | 10/2025 | Baek et al. |
| 2025/0362665 | A1 | 11/2025 | Koziolek et al. |
| 2026/0059297 | A1 | 2/2026 | Bei et al. |
| 2026/0095755 | A1 | 4/2026 | Wendeborn |
| 2026/0119332 | A1 | 4/2026 | Venkatanarayanan et al. |
| 2026/0133790 | A1 | 5/2026 | Hadian et al. |

FOREIGN PATENT DOCUMENTS

| | | | |
|---|---|---|---|
| CN | 113391972 | A | 9/2021 |
| EP | 3282358 | A1 | 2/2018 |
| EP | 3742771 | A1 | 11/2020 |
| EP | 3840439 | B1 | 11/2022 |
| JP | 2005-267014 | A | 9/2005 |
| KR | 10-2011-0056058 | A | 5/2011 |
| WO | 99/01975 | A1 | 1/1999 |
| WO | 2009/137882 | A1 | 11/2009 |
| WO | 2011/036484 | A2 | 3/2011 |
| WO | 2012/079380 | A1 | 6/2012 |
| WO | 2015/036816 | A1 | 3/2015 |
| WO | 2015/080639 | A1 | 6/2015 |
| WO | 2021051219 | A1 | 3/2021 |
| WO | 2022092805 | A1 | 5/2022 |
| WO | 2022/124679 | A1 | 6/2022 |

OTHER PUBLICATIONS

Bei et al., "Network Switch Systems and Methods," U.S. Appl. No. 18/812,900, filed Aug. 22, 2024.

Bei et al., "Network Switch Systems and Methods," U.S. Appl. No. 18/812,902, filed Aug. 22, 2024.

Bei et al., "Network Switch Systems and Methods," U.S. Appl. No. 18/812,903, filed Aug. 22, 2024.

Dynamically Updating SIM Cards Over the Air—filed Nov. 14, 2023—U.S. Appl. No. 18/508,931—First Named Inventor: Prayash Mukherjee.

Eldar et al., "Interface for Digital Operator Platform Including Asynchronous Connection Compatibility," U.S. Appl. No. 18/595,212, filed Mar. 4, 2024.

Eldar et al., "Interface for Digital Operator Platform Including Mobile Virtual Network Enabler Selector," U.S. Appl. No. 18/595,203, filed Mar. 4, 2024.

Eldar et al., "Interface for Digital Operator Platform Including Task Disaggregation," U.S. Appl. No. 18/595,233, filed Mar. 4, 2024.

Eldar et al., "Interface for Digital Operator Platform," U.S. Appl. No. 18/595,194, filed Mar. 4, 2024.

Eldar et al., "Network Switching Including Client Identifier Query," U.S. Appl. No. 18/587,513, filed Feb. 26, 2024.

Eldar et al., "Network Switching Including New Account Identifier Generation and Database Management," U.S. Appl. No. 18/587,470, filed Feb. 26, 2024.

Eldar et al., "Network Switching Including Proactive Network Switch Initiation," U.S. Appl. No. 18/587,528, filed Feb. 26, 2024.

Eldar et al., "Network Switching Including User Profile Field Cloning," U.S. Appl. No. 18/587,500, filed Feb. 26, 2024.

Eldar et al., Network Switching Including Network Switch Availability Verification, U.S. Appl. No. 18/587,460, filed Feb. 26, 2024.

Eldar et al., Network Switching Including Porting in a Phone Number to a Target Network, U.S. Appl. No. 18/587,440, filed Feb. 26, 2024.

GSM Association, "Embedded SIM Remote Provisioning Architecture Version 1.1," Official Document SGP.01, Jan. 30, 2014, 85 pages.

GSM Association, "Internet of Things—How It Works," 2021, retrieved from https://www.gsma.com/iot/embedded-sim/how-it-works/, retrieved on Sep. 15, 2021, 4 pages.

GSM Association, "Remote Provisioning Architecture for Embedded UICC Test Specification Version 4.0," Official Document SGP.11, May 20, 2019, 782 pages.

GSM Association, "RSP Technical Specification Version 2.3," Official Document SGP.22, Jun. 30, 2021, 274 pages.

GSMA Association et al: "Remote Provisioning Architecture for Embedded UICC Technical Specification (Version 3.2)", Official Document, Jun. 27, 2017, pp. 1-309.

Hieb et al., "Carrier Controlled Cellular Telephone Network Migration," U.S. Appl. No. 19/191,910, filed Apr. 28, 2025.

(56) References Cited

OTHER PUBLICATIONS

International Search Report and Written Opinion received for PCT Patent Application No. PCT/US2022/043348, mailed on Dec. 23, 2022, 14 pages.
International Search Report and Written Opinion received for PCT Patent Application No. PCT/US23/74585, mailed on Mar. 12, 2024, 18 pages.
Localization of Wireless Equipment Based on Network Usage Data—filed Dec. 28, 2023—U.S. Appl. No. 18/399,201—First Named Inventor: Dmitry Dimov.
Pre-Download Customization of Electronic Subscriber Identity Module (ESIM)—filed Feb. 16, 2023—U.S. Appl. No. 18/110,690—First Named Inventor: Yongjia Li.
Providing Wireless Services Based on Using Subscriber Geospatial Activity , filed Dec. 11, 2023—U.S. Appl. No. 18/535,633—First Named Inventor: Mikhail Arbuzov.
Suzuki et al., "Standardization of Embedded UICC Remote Provisioning," NTT Docomo Technical Journal 16(2):36-41, 2014.
The 3G4G Blog, "M2M embedded UICC (eSIM) Architecture and Use Cases," Dec. 23, 2014, retrieved from https://blog.3g4g.co.uk/2014/12/m2m-embedded-uicc-esim-architecture- and.html, retrieved on Sep. 15, 2021, 3 pages.
Wendeborn et al., "Network Move Systems and Methods," U.S. Appl. No. 18/902,230, filed Sep. 30, 2024.
Wendeborn et al., "Network Move Systems and Methods," U.S. Appl. No. 18/902,236, filed Sep. 30, 2024.
Wendeborn et al., "Network Move Systems and Methods," U.S. Appl. No. 18/902,241, filed Sep. 30, 2024.
Wendeborn et al., "Network Move Systems and Methods," U.S. Appl. No. 18/902,244, filed Sep. 30, 2024.
International Search Report and Written Opinion received for PCT Patent Application No. PCT/US24/46589, mailed on Oct. 24, 2024, 14 pages.
GSMA, "Requirements for Multi SIM Devices," Version 8.0, 3GPP Draft, Mobile Competence Centre (Jul. 1, 2021).
International Search Report and Written Opinion of the International Searching Authority (EPO) issued in PCT Application No. PCT/US2023/074581 on Nov. 29, 2023.
Partial International Search Results Communication issued by the European Patent Office as the International Searching Authority in PCT Application No. PCT/US2023/074585 on Jan. 17, 2024.
Dyoniziak et al., "Detecting Content of Interest in Streaming Media," U.S. Appl. No. 17/827,211, filed May 27, 2022. (36 Pages).
Nemalipuri et al., "Advertisement Caching for Targeted Delivery," U.S. Appl. No. 18/488,726, filed Oct. 17, 2023. (23 pages).
Nemalipuri, "Prefetching Advertisements for Streaming Delivery," U.S. Appl. No. 18/449,976, filed Aug. 15, 2023. (22 pages).
Analysis on the Awareness and Effect of Mobile Number Portability in Aizawl, Mizoram. Francis Lalmuansanga. (Year: 2022).
Techno-Economic and Regulation Impact Analysis of Mobile Number Portability Implementation. Rizal. IEEE. (Year: 2013).

* cited by examiner

INTELLIGENT SUBSCRIBER IDENTITY MODULE (SIM) SWITCHING

CROSS-REFERENCE TO RELATED APPLICATION(S)

This application claims the benefit of U.S. Provisional Patent Application No. 63/421,119 filed Oct. 31, 2022. The subject matter of this earlier filed application is hereby incorporated by reference in its entirety.

FIELD

The present invention generally relates to communications, and more specifically, to intelligent subscriber identity module (SIM) switching for user equipment (UE) devices.

BACKGROUND

A SIM allows user equipment (UE), such as mobile devices, desktop computers with appropriate hardware, vehicle telecommunications systems, etc., to be identified and authenticated on a network. The UE is identified by the international mobile subscriber identity (IMSI) number associated with the SIM. The SIM identifies which service provider network that the UE connects with.

Network service providers may provide customers with a device with a preinstalled SIM for their network, or users may insert a SIM for the network into their own device. The SIM may also be associated a phone number for the device. A SIM may be a physical SIM (pSIM) or an embedded SIM (eSIM). A pSIM is a physical card that is inserted into an associated slot in the UE. An eSIM, on the other hand, is a digital version of a pSIM including a profile that can be downloaded to a mobile device to provide functionalities of a pSIM.

Currently, fifth generation (5G) devices with dual SIM support are available where UE can utilize a pair of SIMs, whether physical SIMs, eSIMs, or one of each. However, switching between SIMs is not performed intelligently or optimally. Accordingly, an improved and/or alternative approach may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to intelligent SIM switching for UE devices.

In an embodiment, an intelligent subscriber management server includes memory storing computer program instructions configured to facilitate roaming intelligent SIM switching for a plurality of UE devices and at least one processor configured to execute the computer program instructions. The computer program instructions are configured to cause the at least one processor to monitor traffic from the plurality of UE devices routed through home network infrastructure via a radio access network (RAN) of the home network infrastructure, or routed through the home network infrastructure from carrier network infrastructure of another carrier. The computer program instructions are also configured to cause the at least one processor to determine that a UE device of the plurality of UE devices should switch from switch from a current SIM or SIM profile to a different SIM or SIM profile in accordance with a policy. The computer program instructions are further configured to cause the at least one processor to instruct the UE device of the plurality of UE devices to switch to the different SIM or SIM profile.

In another embodiment, a computer-implemented method for facilitating roaming intelligent SIM switching for a plurality of UE devices includes monitoring, by an intelligent subscriber management server, traffic from the plurality of UE devices routed through home network infrastructure via a RAN of the home network infrastructure, or routed through the home network infrastructure from carrier network infrastructure of another carrier. The computer-implemented method also includes determining, by the intelligent subscriber management server, that a UE device of the plurality of UE devices should switch from switch from a current SIM or SIM profile to a different SIM or SIM profile in accordance with a policy. The computer-implemented method further includes instructing the UE device of the plurality of UE devices to switch to the different SIM or SIM profile, by the intelligent subscriber management server.

In yet another embodiment, a non-transitory computer-readable medium stores a computer program for facilitating roaming intelligent SIM switching for a plurality of UE devices. The computer program is configured to cause at least one processor to monitor traffic from the plurality of UE devices routed through home network infrastructure via a RAN of the home network infrastructure, or routed through the home network infrastructure from carrier network infrastructure of another carrier. The computer program is also configured to cause the at least one processor to determine that a UE device of the plurality of UE devices should switch from switch from a current SIM or SIM profile to a different SIM or SIM profile in accordance with a policy taking into account locations of the plurality of UE devices, hardware capabilities of the plurality of UE devices, compatibility of the plurality of UE devices with carrier networks associated with a plurality of SIMs or SIM profiles, services that the plurality of UE devices are configured to use, carrier networks that are available in respective locations of the plurality of UE devices, network quality criteria, subscription criteria, cost criteria, or any combination thereof. The computer program is further configured to cause the at least one processor to instruct the UE device of the plurality of UE devices to switch to the different SIM or SIM profile. The policy is predictive and uses deterministic logic based on observations over time, probabilistic logic of one or more artificial intelligence (AI)/machine learning (ML) models, or both, and/or the computer program is configured to determine the policy based on the one or more AI/ML models.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1A:
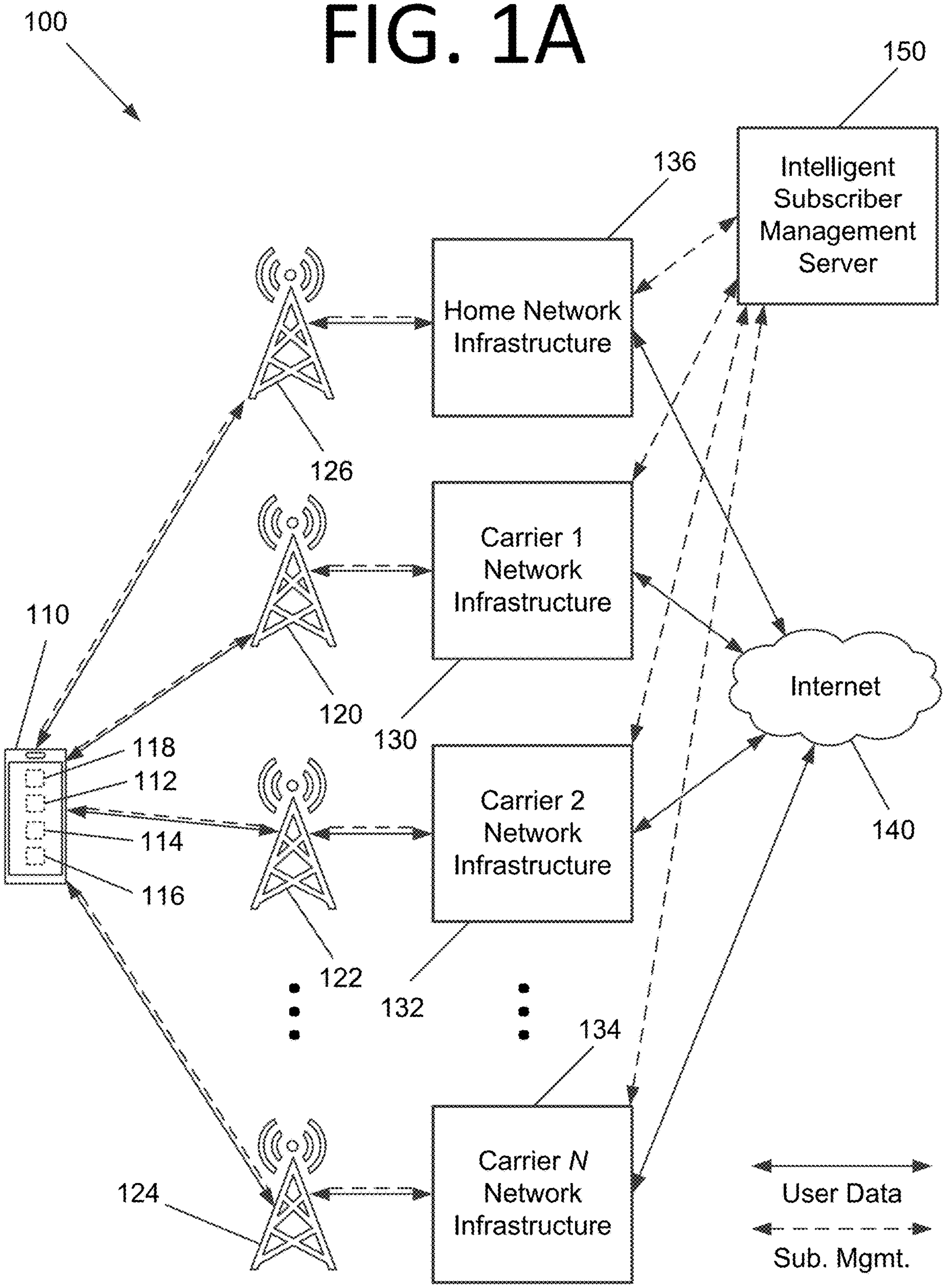
FIG. 1A is an architectural diagram illustrating carrier networks configured to implement intelligent SIM switching, according to an embodiment of the present invention.

Some embodiments pertain to intelligent SIM switching for UE devices. The UE may have multiple SIMs for multiple carrier networks (i.e., mobile network operators (MNOs) that provide wireless network infrastructure, such as radio access networks (RANs)) or a universal SIM. It may be desirable to switch between SIMs for various reasons, such as based on network quality criteria, subscription criteria, agreement criteria between MNOs, etc. These criteria may inform a policy for determining which SIM to use.

In some embodiments, a rules engine is used to determine whether to switch SIMs and the associated carrier networks in accordance with a policy. The rules engine may apply business logic to determine the networks and configuration to be used. In some embodiments, the rules engine may take into account the location, UE device capabilities and compatibility with the carrier networks, the services that the UE uses, which carrier networks are available in the location, network quality criteria, subscription criteria, cost criteria, etc. The rules engine then returns the network to which the UE should switch.

For example, if a user has a subscription that uses the lowest cost carrier network that is available, the policy may cause the UE to always use the SIM for the lowest cost available carrier network that meets certain minimum quality criteria (e.g., a minimum signal strength, signal-to-noise ratio (SNR) signal to interference and noise ratio (SINR), etc.). If a user has a high tier subscription, on the other hand, the SIM for the highest quality available carrier network may be selected. More complex, tiered policies are also possible. For instance, certain carrier networks may be preferred in certain areas, different carrier networks and their SIMs may be preferred for different services (e.g., there may be a list of preferred carrier networks for voice and short message service (SMS) and another list of preferred carrier networks for data services), artificial intelligence (AI)/machine learning (ML) models may be employed (e.g., to predict congestion at different times of the day/week/month, network quality, weather impacts, etc.), etc.

Some embodiments may be reactive or predictive. Reactive embodiments may switch SIMs based on detected criteria, such as a drop in signal strength below a minimum threshold or detection that a local RAN for a carrier has gone down, a change in the location of the UE, detection that an antenna of the UE is no longer working such that a certain band can no longer be used, etc. Predictive embodiments, on the other hand, may use deterministic logic based on observations over time and/or probabilistic logic in the form of AI/ML models. Such predictive approaches may be more beneficial for cars, drone delivery networks, etc. However, any suitable UE device, such as smart phones, personal computers, etc., may benefit from predictive techniques without deviating from the scope of the invention.

In some embodiments, the policy that is used may be determined for the current UE conditions using AI/ML models. For instance, AI/ML models may be used to learn that when a certain policy to prefer a certain carrier SIM that has less cost for a brand associated with the smart phone is used in a first area, users tend to cancel their subscriptions and switch carriers at a high rate. However, in a second another area, the number of cancellations is low. The AI/ML model may intelligently recommend that a policy that tends not to recommend the lower cost carrier be used in the first area and a policy that recommends a higher cost carrier be used in the second area.

In order to enable and inform the intelligent SIM switching logic, information regarding current conditions detected by the UE device (e.g., the location, the signal strength, SNR, SINR, etc. for detected networks at the location, which SIM profiles are available for the UE, UE hardware capabilities (e.g., supported bands), etc.) may be provided to the network infrastructure for the carrier that is implementing the intelligent SIM switching. Server-side logic may then be employed to analyze network loading and congestion, subscription information, carrier contract information, apply AI/ML models, etc. in real time or near-real time and make a choice regarding which SIM identity to use at a given time.

In some embodiments, active network metrics are captured from UE devices to gain insight into the performance of different carrier networks and build network data profiles over time, as well as current performance in real time or near-real time. This information may be used to identify trends for the carrier networks, to provide training data to train/retrain AI/ML models, etc.

In some embodiments, different policy rules may be weighted. For instance, for a lower cost subscription, a relatively heavy static weight may be applied to the priority of selecting the lowest cost network. Another weight may be applied to network quality metrics that decreases as network quality decreases (e.g., a linear, exponential, or step function tied to signal strength, SNR, SINR, congestion, etc.). In certain embodiments, weights for various criteria may be learned and provided by AI/ML models.

In some embodiments, a SIM for a certain carrier network may be selected by default if that carrier network is available and meets certain minimum quality criteria at the UE location. In certain embodiments, different rules may be applied to different brands, and these rules may at least partially depend on the hardware capabilities of the given carrier network. In some embodiments, the rules could be venue based if there is a managed private network. For instance, customers may prefer the managed private network over other networks.

To perform intelligent SIM switching, radio connections to available RANs for each SIM are maintained in accordance with a list of carrier networks. This list is provided to the modem of the UE to scan and connect to the RANs. If a carrier network is not available, the carrier network is dropped from the scan list. Conversely, if a carrier network becomes available, the carrier network is added to the scan list. The UE periodically checks which carrier networks are available such that an updated list is maintained for the UE location.

In some embodiments, the primary roaming network in the SIM profile configures the UE with the optimum parameters for the initial network that the UE connects to at activation. Multiple considerations, such as the location of the subscriber, the network loading, the quality of the services, etc., may be taken into account for the initial network selection decision in some embodiments. For instance, if the UE is purchased at an AT&T® store or a Verizon® store, the UE may be optimally configured for that network initially. In other words, software and hardware of the UE would be optimized for that carrier. If optimized for AT&T®, the UE may not support band n71 and outer bands, and AT&T® may also have a priority list for the bands it supports, a certain packet size that it uses, etc.

The UE then dynamically reconfigures itself based on the actual network that the UE is attached to. For instance, if the UE initially configured for the AT&T® network switches to T-Mobile®, the UE settings may be changed so n71 is supported, n41 is used for better throughput, etc. Thereafter, the policy (e.g., the network quality, the service grade, the device location, the subscription, etc.) drives dynamic reconfiguration of the UE.

Intelligent, dynamic SIM switching occurs when the UE is actively used by the subscriber after the initial activation of the UE and may take into account temporal and geographic factors (e.g., typical network loading at certain times and locations, which may be learned by one or more AI/ML models). Depending on the time of day, for example, the quality of the services required by the user might drive the decision to switch the network. Alternatively, when the user travels to a certain location, such as a university campus, a subway tunnel, a business location, etc., a specific network may provide the best service to the user.

For a voice supporting device, switching requires a number porting processes. Hence, from user experience perspective, a data-only device is most practical since switching can be done without user intervention. For voice devices, dual SIM dual standby (DSDS) may be used since the voice service can stay on an initially provisioned network on one SIM while data networks can be switched on the other SIM as desired. See, for example, U.S. patent application Ser. No. 18/174,216. Alternatively, a data voice application, such as WhatsApp®, may be used on data-only devices, which allows any desired data network to be selected. In such a case, a carrier grade voice service (Internet Protocol (IP) Multimedia Subsystem (IMS) voice is the only current way to guarantee voice quality) is sacrificed in lieu of seamless network switching.

Currently, the network order information is static and fixed. However, some embodiments update the network for voice and/or data dynamically, depending on the aforementioned conditions. This operation can be achieved by updating the configuration in a given SIM, but conceptually, it can be achieved by switching the SIM as well. Such techniques may be applicable to both single SIM and multi-SIM devices (e.g., DSDS devices).

FIG. 1A is an architectural diagram illustrating a wireless communications system 100 with multiple (N) networks and UE 110 that are configured to implement intelligent SIM switching, according to an embodiment of the present invention. User data traffic is shown with solid lines and subscriber management traffic is shown with dashed lines. UE 110 includes three SIMs in this embodiment—SIM 112 for carrier 1, SIM 114 for carrier 2, SIM 116 for carrier N, and SIM 118 for the home network. Any desired number of SIMs may be included in UE 110 without deviating from the scope of the invention. Also, SIMs 112, 114, 116 may be pSIMs, eSIMs, or a combination thereof. In some embodiments, a universal SIM may be used in place of multiple SIMs, and the appropriate eSIM may be downloaded after the network to switch to is selected. SIMs 112, 114, 116, respectively, allow UE 110 to communicate with carrier 1 network infrastructure 130, carrier 2 network infrastructure 132, carrier N network infrastructure 134, and home network infrastructure 136 (i.e., the carrier network cores) via respective RANs 120, 122, 124, 126. Home network infrastructure 136 and carrier network infrastructure 130, 132, 134 also communicate with an intelligent subscriber management server 150. While a single intelligent subscriber management server 150 is shown, multiple servers may be used in some embodiments, depending on traffic and processing requirements. Intelligent subscriber management server 150 may perform the network and SIM switching functionality disclosed herein. In some embodiments, UE 110, computing systems of RANs 120, 122, 124, and/or computing systems of carrier network infrastructure 130, 132, 134 and home network infrastructure 136 may be computing system 1000 of FIG. 10.

Carrier network infrastructure 130, 132, 134 and home network infrastructure 136 may include computing systems and other equipment associated with pass-through edge data centers (PEDCs), breakout edge data centers (BEDCs), regional data centers (RDCs), national data centers (NDCs), etc. Carrier network infrastructure 130, 132, 134 and home network infrastructure 136 may provide various network functions (NFs) and other services. For instance, BEDCs may break out User Plane Function (UPF) data traffic (UPF-d) and provide cloud computing resources and cached content to UE 110, such as providing NF application services for gaming, enterprise applications, etc. RDCs may provide core network functions, such as UPF for voice traffic (UPF-v) and Short Message Service Function (SMSF) functionality. NDCs may provide a Unified Data Repository (UDR) and user verification services, for example. Other network services that may be provided may include, but are not limited to, IMS+telephone answering service (TAS) functionality, IP-SM gateway (IP-SM-GW) functionality (the network functionality that provides the messaging service in the IMS network), enhanced serving mobile location center (E-SMLC) functionality, policy and charging rules function (PCRF) functionality, mobility management entity (MME) functionality, signaling gateway (SGW) control plane (SGW-C) and user data plane (SGW-U) ingress and egress point functionality, packet data network gateway (PGW) control plane (PGW-C) and user data plane (PGW-U) ingress and egress point functionality, home subscriber server (HSS) functionality, UPF+PGW-U functionality, access and mobility management (AMF) functionality, HSS+unified data management (UDM) functionality, session management function (SMF)+PGW-C functionality, short message service center (SMSC) functionality, and/or policy control function (PCF) functionality. It should be noted that additional and/or different network functionality may be provided without deviating from the present invention. The various functions in these systems may be performed using dockerized clusters in some embodiments.

The intelligent SIM switching process in some embodiments may be initiated by intelligent subscriber management server 150 via control messages delivered through a regular Internet connection of UE 110, for example. For instance, if UE 110 is using SIM 112 for RAN 120 and carrier network infrastructure 130, and intelligent subscriber management server 150 would like to switch UE 110 to a different carrier network, or UE 110 detects that the connection characteristics for RAN 120 have degraded to poor quality (e.g., signal strength, SNR, and/or SINR have fallen below certain minimum quality thresholds), UE 110 may switch SIMs and connect to a different carrier network based on the control messages, or may switch to another network itself if the home network cannot be reached. Alternatively, UE 110 may reach home network infrastructure 136 and intelligent subscriber management server 150 through the Internet 140 (connection not shown) or through another carrier network. However, in some embodiments, the home network may be a mobile virtual network operator (MVNO). In such embodiments, home network infrastructure 136 may be used for data services and carrier network infrastructure 130, 132, 134 may be used for voice services. Intelligent subscriber management server 150 may be one or more of its own servers, and potentially other network infrastructure. However, in some embodiments, intelligent subscriber management server 150 is part of home network infrastructure 136.

In some embodiments, a policy for the UE implemented on intelligent subscriber management server 150 may determine that UE 110 should switch to a different carrier network. For instance, if the policy indicates that UE 110 should switch to carrier 2, intelligent subscriber management server 150 sends control messages to UE 110 via the Internet 140 or RAN 126 to switch to carrier 2. UE 110 then switches to SIM 114 (potentially downloading SIM 114 responsive to the control messages), connects to carrier network 2, and begins using RAN 122 and carrier network infrastructure 132 for services.

Figure 1B:
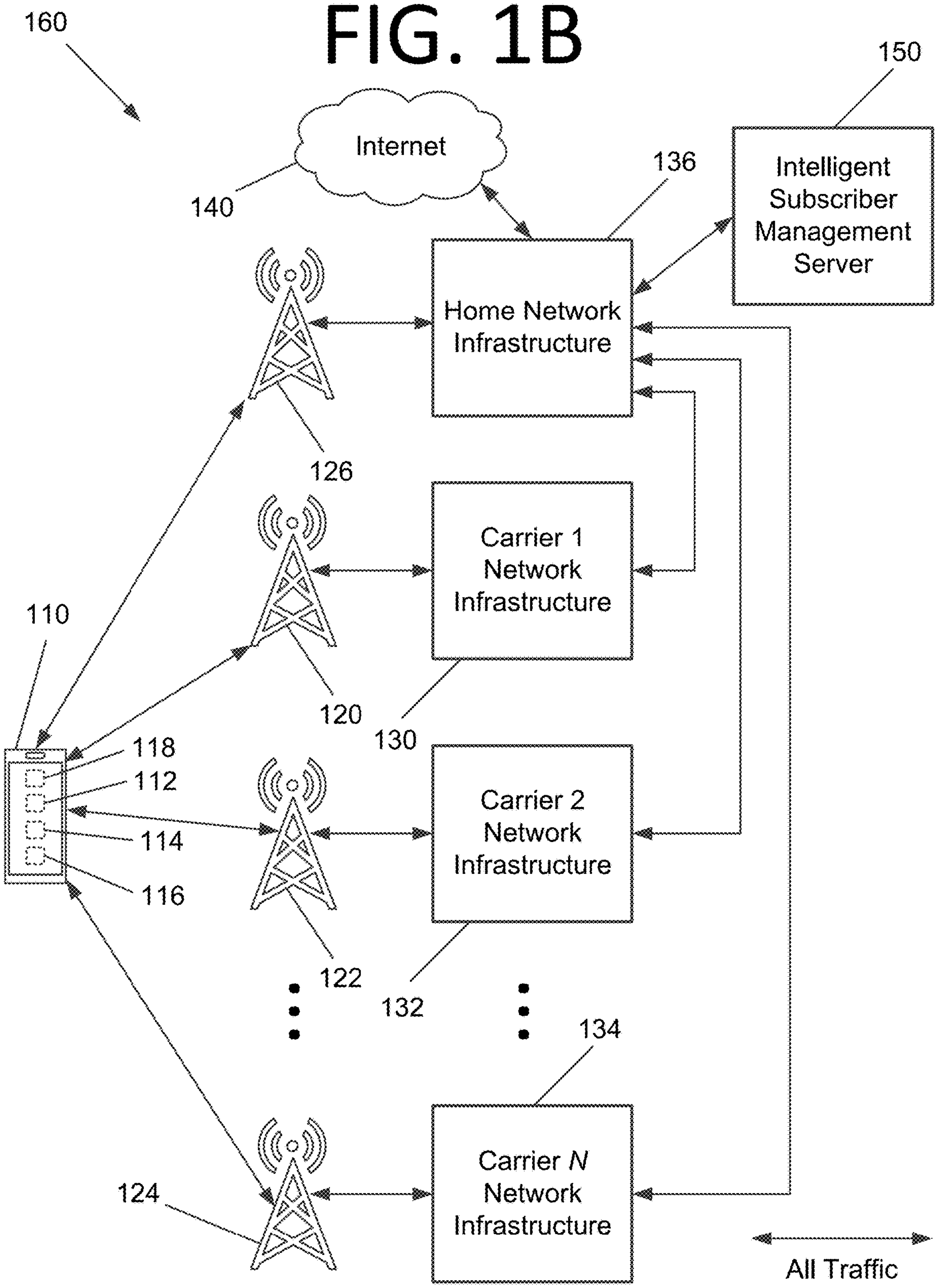
FIG. 1B is an architectural diagram illustrating carrier networks configured to implement intelligent SIM switching in a roaming scenario, according to an embodiment of the present invention.

FIG. 1B is an architectural diagram 160 illustrating carrier networks configured to implement intelligent SIM switching in a roaming scenario, according to an embodiment of the present invention. As is the case in FIG. 1A, UE 110 includes SIMs 112, 114, 116, 118, RANs 120, 122, 124, carrier network infrastructure 130, 132, 134, home network infrastructure 136, and intelligent subscriber management server 150. However, in this scenario, rather than user data traffic being sent by carrier network infrastructure 130, 132, 134 and home network infrastructure 136 to/from the Internet 140, and subscriber management traffic being sent from carrier network infrastructure 130, 132, 134 and home network infrastructure 136 to intelligent subscriber management server 150, in this embodiment, all traffic is sent from carrier network infrastructure 130, 132, 134 to home network infrastructure 136. Only home network infrastructure 136 communicates with intelligent subscriber management server 150 in this embodiment.

For roaming, UE 110 may use RAN 120, 122, or 124 and respective carrier network infrastructure 130, 132, or 134 to route all traffic (e.g., voice/SMS, data, and subscriber management traffic) to home network infrastructure 136, and vice versa. For instance, if UE 110 is connected to RAN 120, the traffic flow for data traffic from UE 110 to home network infrastructure 136 would be UE 110 to RAN 120 to carrier 1 network infrastructure 130 to home network infrastructure 136 to the Internet 140. As such, the roaming scenario does not necessarily involve SIM switching. However, if UE 110 has a connection available to the Internet 140 (not shown), UE 110 may communicate with carrier network infrastructure 136 for voice/SMS and subscriber management traffic via the Internet 140 without going through another carrier network in some embodiments. UE 110 may also send data traffic to and receive data traffic from the Internet 140 directly.

In scenarios where two or more SIMs are used, such as is the case for UE 110, SIM 118 (which is used for voice in this case) could roam into carrier network 1 once SIM 118 loses home network coverage (not involving SIM switching). However, the SIM used for data (SIM 114 or SIM 116 in this case) could be switched. The operation in roaming may be the same as the home network situation except for situations such as the DSDS case, where one SIM is attached to a carrier network for voice and SMS (e.g., carrier network 1) and the other SIM is switched among the remaining carriers. In the single SIM case, this SIM switches among the carrier networks, with a preference for cannier network 1, where communications could be home routed. The other carrier networks (carrier network 2 . . . carrier network/V) are not home routed.

Figure 2:
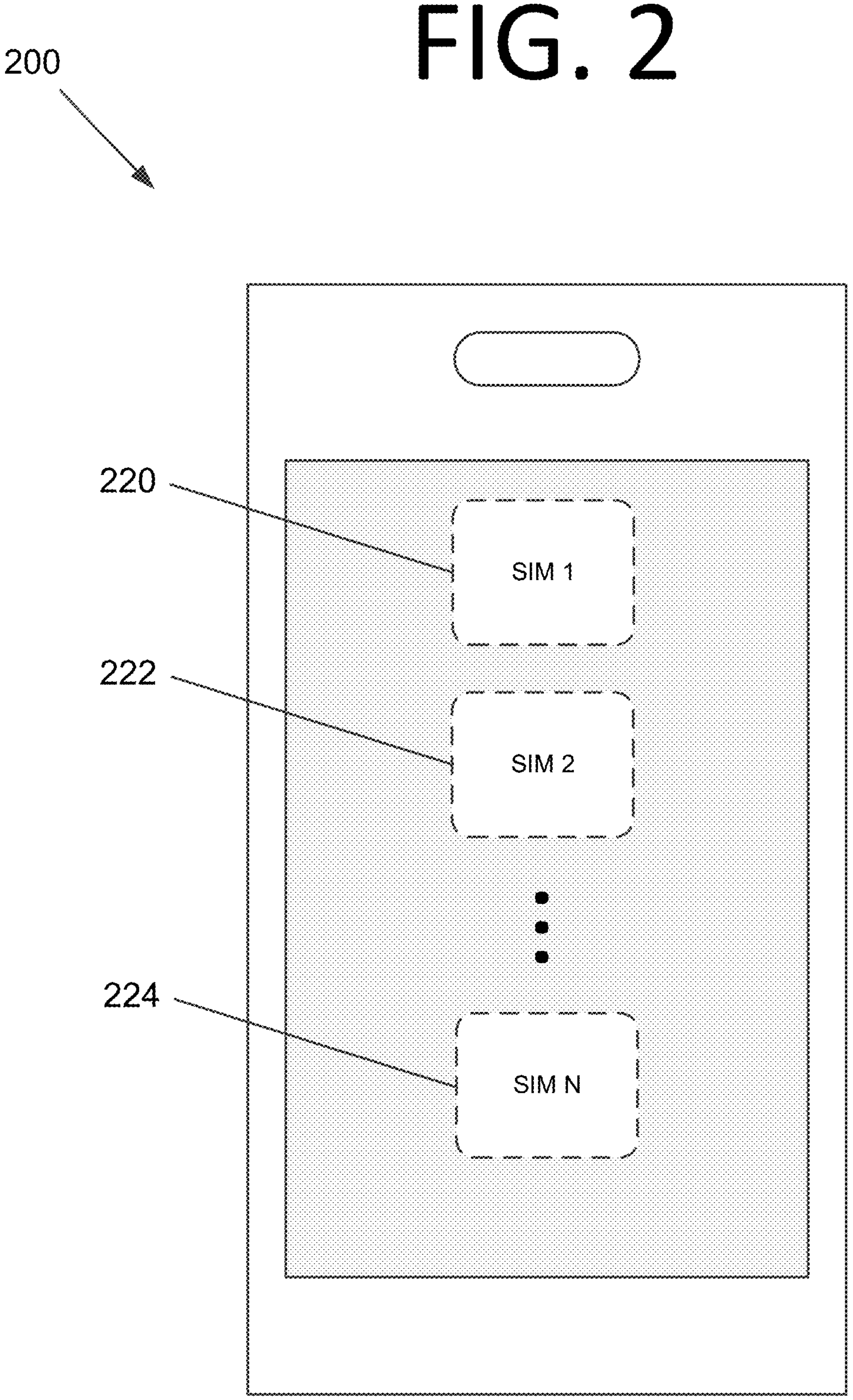
FIG. 2 illustrates the mobile device with N SIMs notionally depicted, according to an embodiment of the present invention.

Any number of SIMs may be used without deviating from the scope of the invention, so long as the UE supports them. FIG. 2 illustrates a mobile device 200 with multiple SIMs, according to an embodiment of the present invention. In some embodiments, mobile device 200 may be UE 110 of FIG. 1 and/or computing system 1000 of FIG. 10. Mobile device 200 has N SIMs in this embodiment (e.g., SIM 1 220, SIM 2 222, . . . , SIM N 224). Each of SIMs 1 to N may be a pSIM or an eSIM and is associated with a respective MNO.

Figure 3:
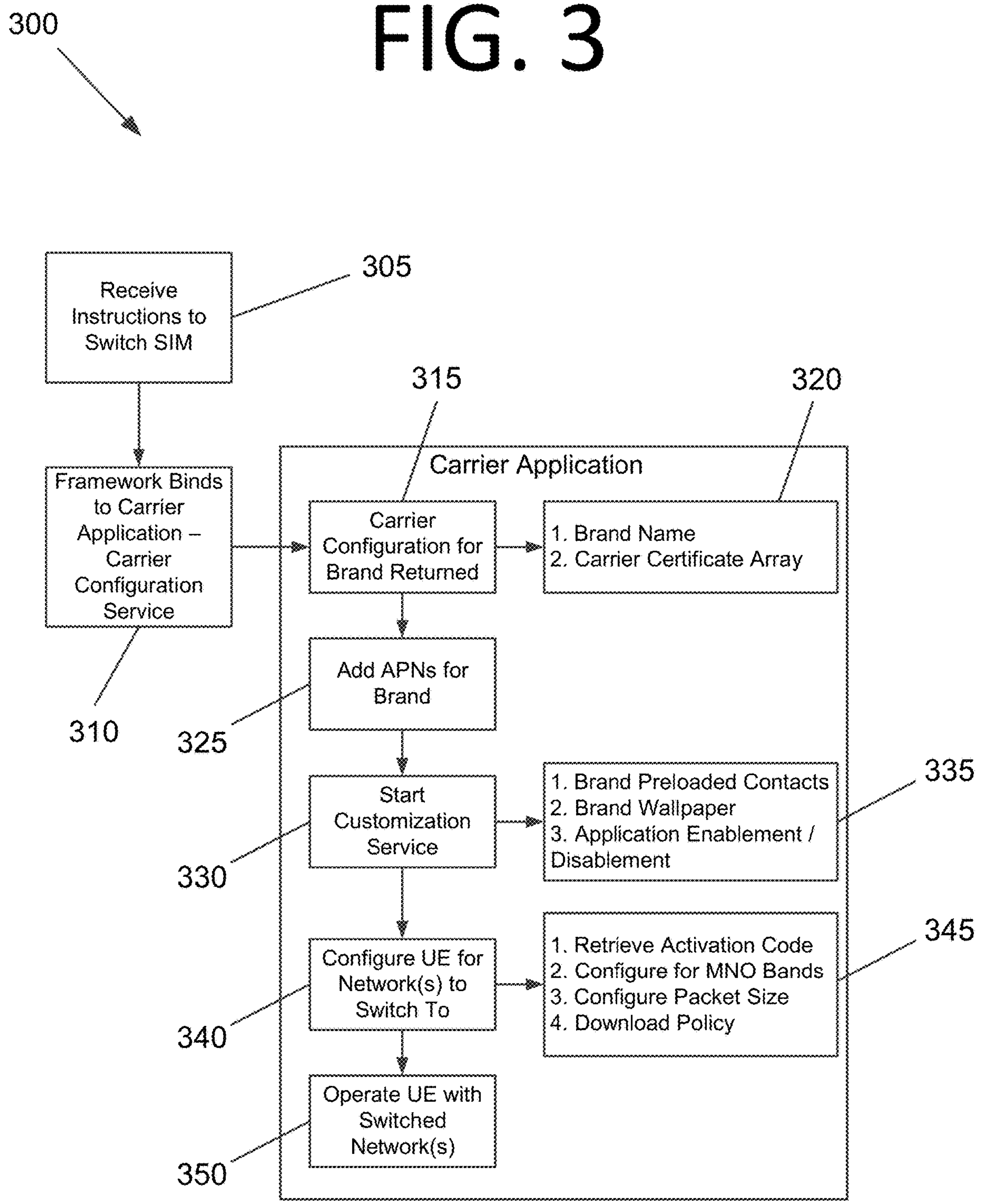
FIG. 3 is a flow diagram illustrating a process for configuring a UE device to switch to a different SIM, according to an embodiment of the present invention.

FIG. 3 is a flow diagram illustrating a process 300 for configuring a UE device to switch to a different SIM, according to an embodiment of the present invention. The process begins with receiving instructions to switch to a different SIM at 305. This may include downloading an eSIM to switch to in some embodiments. The UE framework (e.g., the operating system) binds to the carrier application of the UE at 310 via a carrier configuration service running within the carrier application in some embodiments. As used herein, "binding" refers to launching the carrier application and connecting to a service running within the carrier application. From that point onwards, the framework is able to invoke the APIs that are exposed by the service.

The carrier application determines which SIMs to use for different services in some embodiments, such as one SIM for data and another SIM for voice and SMS. However, in certain embodiments, only a single SIM is switched to. The carrier application may also help to facilitate download of the eSIM profile when an eSIM is used.

The carrier configuration for the brand for the SIM to switch to is returned at 315, including the brand name and carrier certificate array 320. The access point names (APNs) for the brand are added at 325 and a customization service is started at 330. The customization service operations 335 include obtaining the brand preloaded contacts, the brand wallpaper, and the application enablement/disablement settings.

The network configuration is then started at 340. The configuration operations 345 may include retrieving an activation code, configuring the UE for the bands used by the network MNO, configuring the packet size to that used by the MNO, and downloading a policy for the user's subscription to be used on the UE side. The policy may govern which MNO the UE uses for which services and under what conditions in some embodiments. The UE then operates with the MNO(s) that it switched to at 350 using the SIM(s) for those MNO(s).

Figure 4:
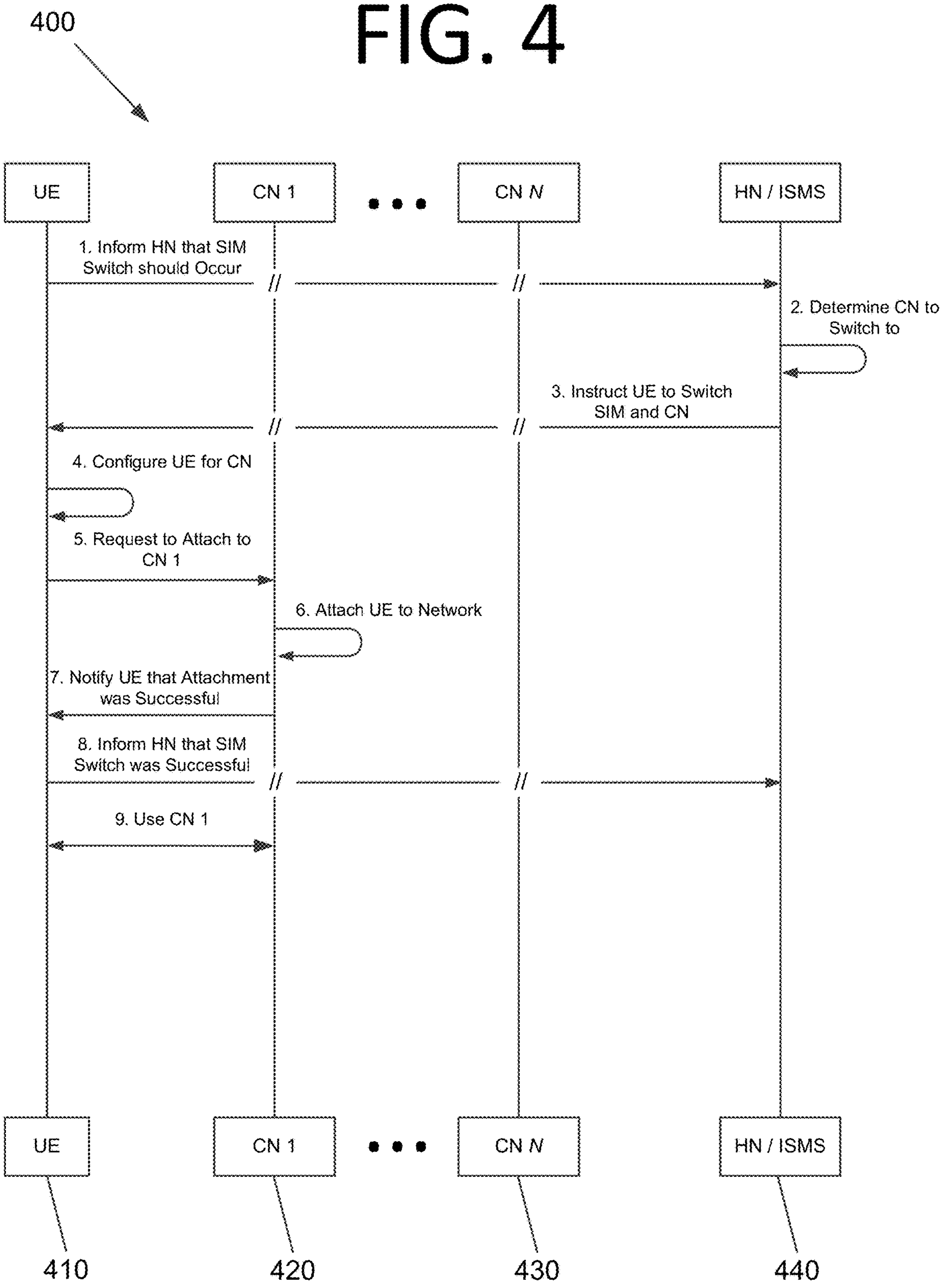
FIG. 4 is a flow diagram illustrating a process for intelligent SIM switching, according to an embodiment of the present invention.

FIG. 4 is a flow diagram illustrating a process 400 for intelligent SIM switching, according to an embodiment of the present invention. The system includes UE 410, carrier networks (e.g., RANs, PEDCs, BEDCs, RDCs, NDCs, etc.) CN 1 420 through CN N 430, and home network/intelligent subscriber management server 440. The process begins with UE 410 informing home network/intelligent subscriber management server 440 that a SIM switch should occur. Home network/intelligent subscriber management server 440 then determines which carrier network to switch to and instructs UE 410 to switch to the SIM for that CN. In this example, CN 1 420 has been selected.

UE 410 configures itself to switch to CN 1 420. In some embodiments, this may include downloading an eSIM for CN 1 420. In the case of an eSIM, a device carrier application with the correct privileges, such as that of FIG. 3, can use a local profile assistant (LPA) to switch the eSIM profile that is enabled. The LPA is a set of functions in the UE that are responsible for providing the capability to download encrypted profiles to the SIM.

In some embodiments, the pSIM can operate in a similar manner to the eSIM if the pSIM is loaded with the eSIM profile. If the pSIM is loaded with the conventional pSIM profile, SIM switching would mean physically removing one pSIM and inserting another pSIM. Hence, it is beneficial to load the pSIM with the desired eSIM profile to have SIM switching work with the same pSIM.

Currently, there are two choices—a consumer eSIM profile and a machine-to-machine (M2M) eSIM profile. The major technical difference between the two is that the consumer eSIM uses a PULL model (i.e., the device/client is put in control for profile management and the LPA plays the role in the device), whereas an M2M eSIM profile uses a PUSH model (i.e., control occurs at the backend/server). An M2M eSIM profile may be used on a pSIM in some embodiments, and the server/backend (e.g., the SM-DP) may use SMS to control the eSIM profile.

UE 410 requests to attach to CN 1 420, and CN 1 420 attaches UE 410 to the network. CN 1 420 notifies UE 410 that the attachment was successful, and UE 410 informs home network/intelligent subscriber management server 440 that the SIM switch was successful. UE 410 then uses CN 1 420 for communications services.

Figure 5:
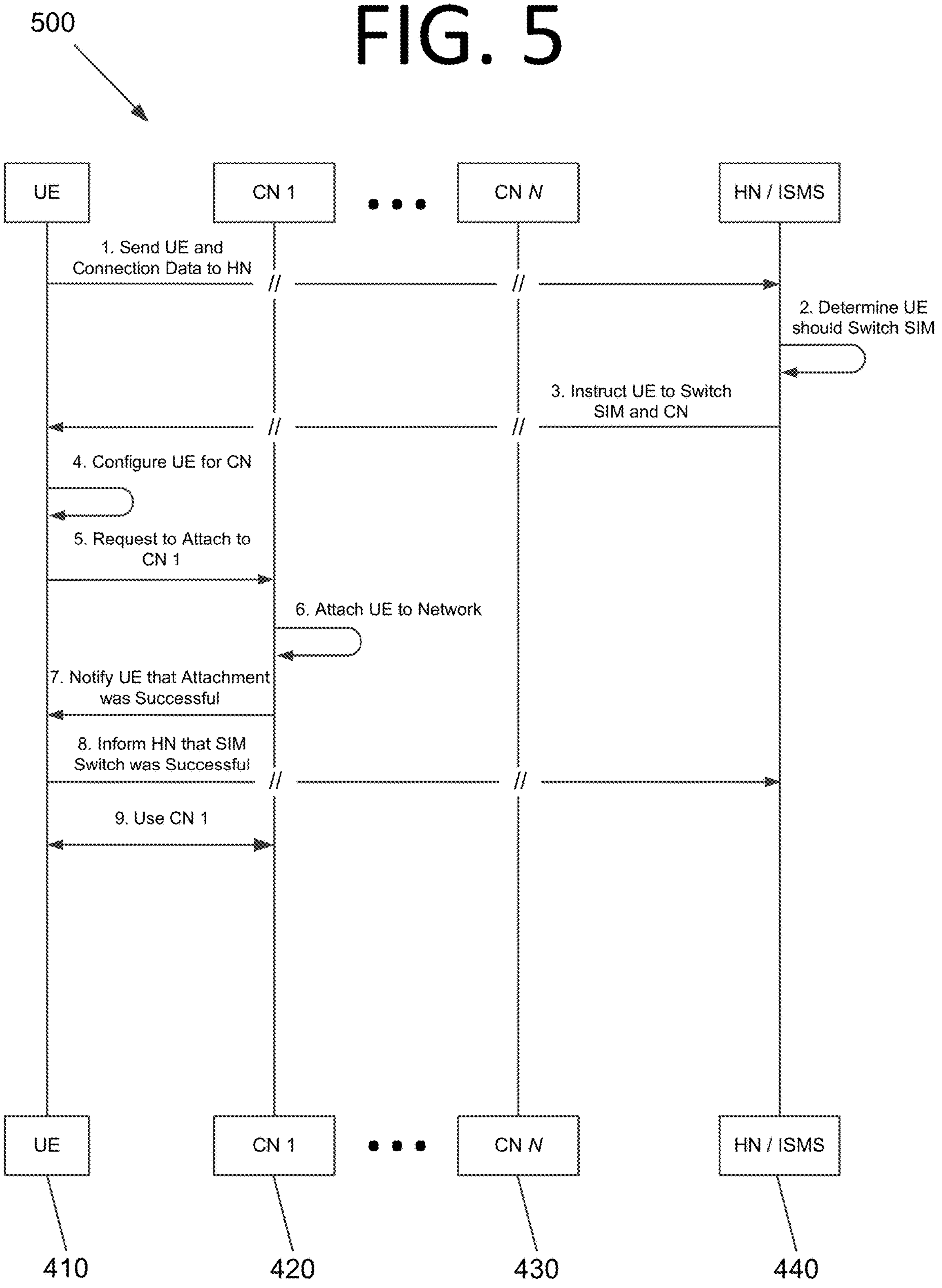
FIG. 5 is a flow diagram illustrating another process for intelligent SIM switching, according to an embodiment of the present invention.

FIG. 5 is a flow diagram illustrating another process 500 for intelligent SIM switching, according to an embodiment of the present invention. In this example, home network/intelligent subscriber management server 440 makes the determination that UE 410 should switch rather than UE 410 doing so. UE 410 sends data pertaining to UE 410 (e.g., hardware information, bands that UE 410 supports, etc.) and connection data to available carrier networks to home network/intelligent subscriber management server 440. Home network/intelligent subscriber management server 440 may use this information as part of the SIM switching decision process. In this example, CN 1 420 has been selected.

UE 410 configures itself to switch to CN 1 420. UE 410 requests to attach to CN 1, 420, and CN 1 420 attaches UE 410 to the network. CN 1 420 notifies UE 410 that the attachment was successful, and UE 410 informs home network/intelligent subscriber management server 440 that the SIM switch was successful. UE 410 then uses CN 1 420 for communications services.

Figure 6:
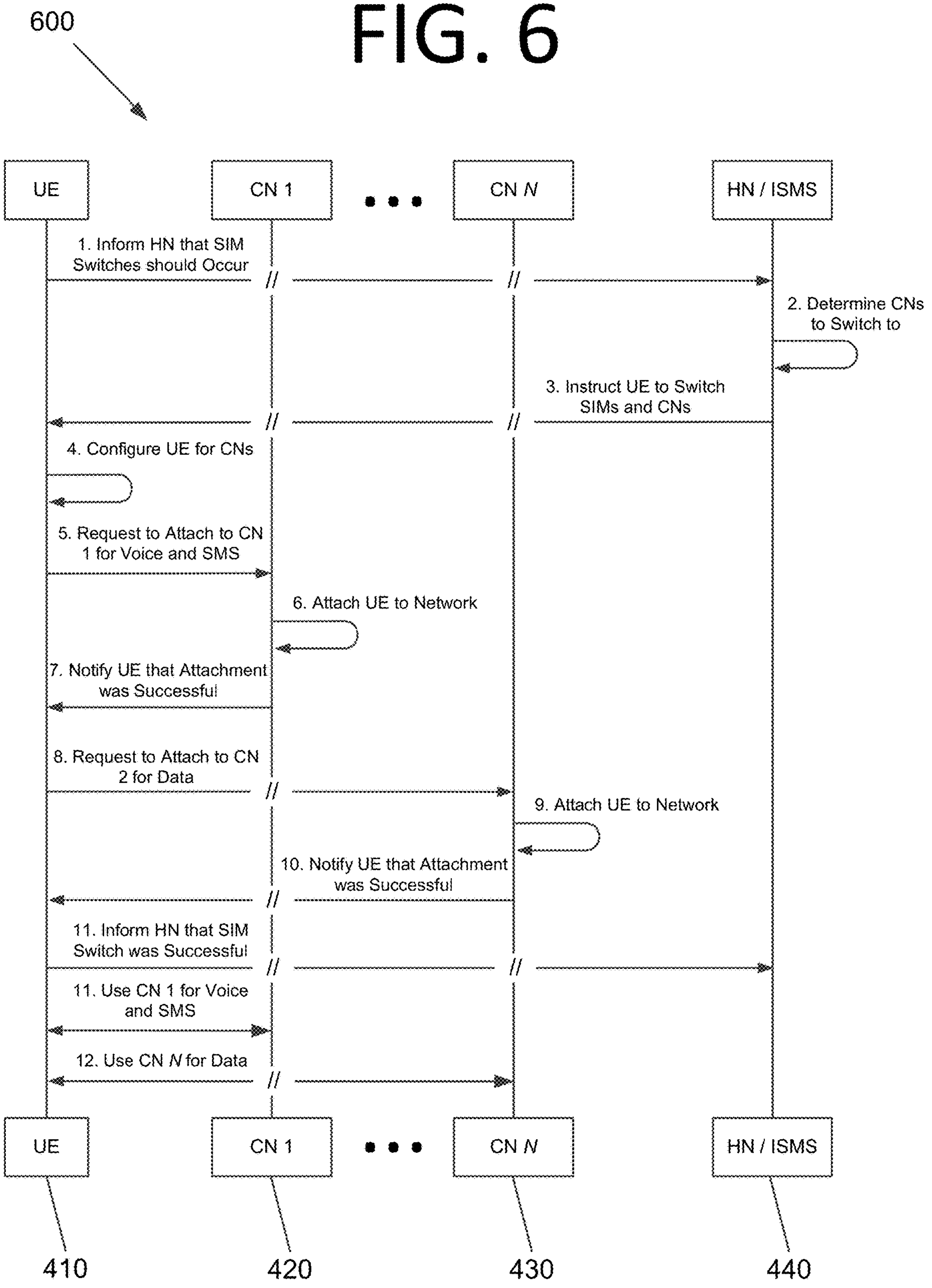
FIG. 6 is a flow diagram illustrating yet another process for intelligent SIM switching, according to an embodiment of the present invention.

FIG. 6 is a flow diagram illustrating yet another process 600 for intelligent SIM switching, according to an embodiment of the present invention. In this example, UE 410 uses one carrier network for voice and SMS and another carrier network for data. The process begins with UE 410 informing home network/intelligent subscriber management server 440 that SIM switches should occur. Home network/intelligent subscriber management server 440 then determines which carrier networks to switch to for voice and SMS and for data, respectively, and instructs UE 410 to switch to the SIMs for those CNs. In this example, CN 1 420 has been selected for voice and SMS and CN N 430 has been selected for data.

UE 410 configures itself to switch to CN 1 420. UE 410 requests to attach to CN 1 420 and CN N 430, and CN 1 420 and CN N 430 attach UE 410 to their respective networks. CN 1 420 and CN N 430 notify UE 410 that the attachment was successful, and UE 410 informs home network/intelligent subscriber management server 440 that the SIM switches were successful. UE 410 then uses CN 1 420 for voice and SMS and CN N 430 for data.

Figure 7:
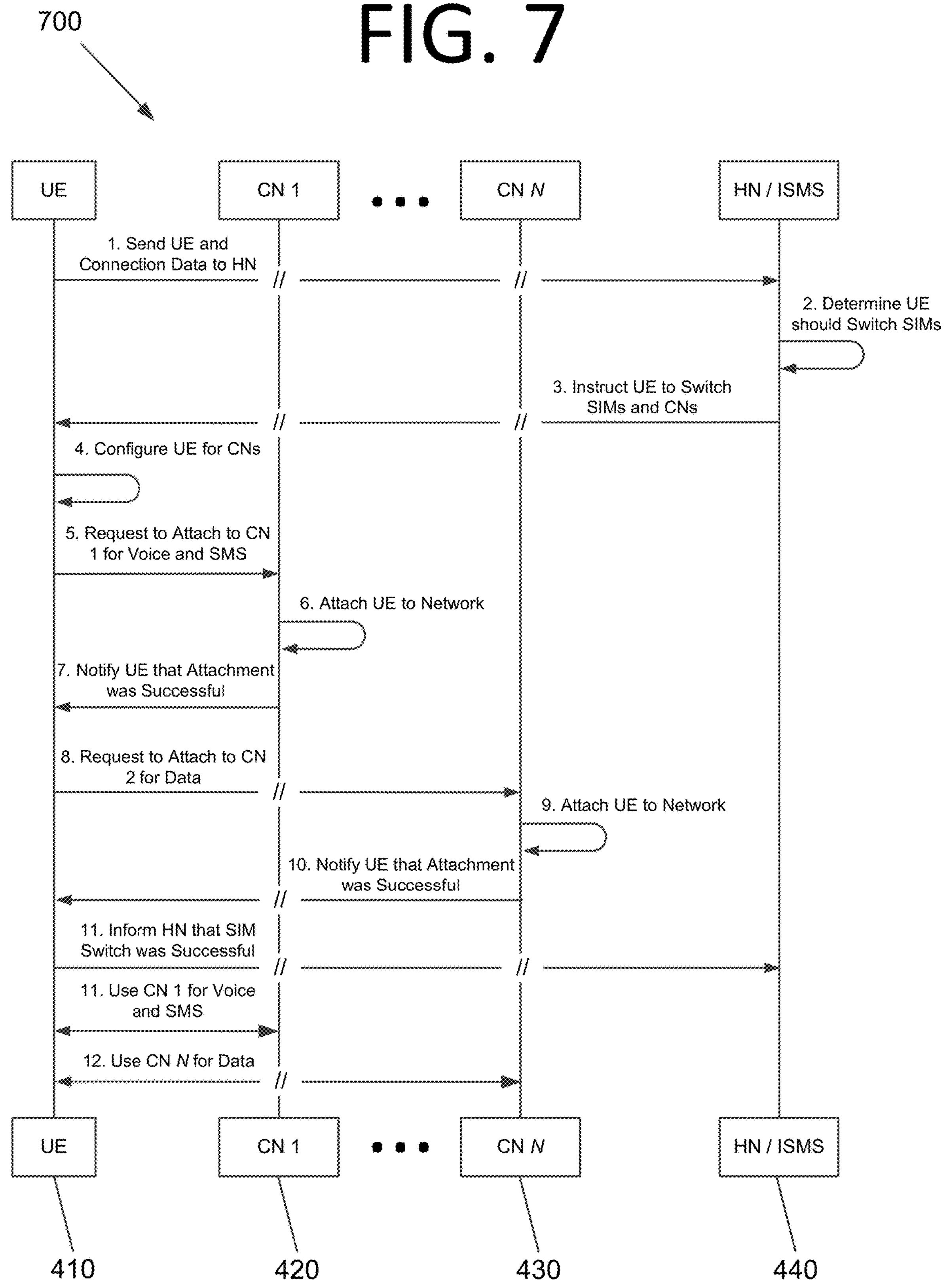
FIG. 7 is a flow diagram illustrating still another process for intelligent SIM switching, according to an embodiment of the present invention.

FIG. 7 is a flow diagram illustrating still another process 700 for intelligent SIM switching, according to an embodiment of the present invention. As with FIG. 6, UE 410 uses one carrier network for voice and SMS and another carrier network for data. However, in this example, home network/intelligent subscriber management server 440 makes the determination that UE 410 should switch SIMs rather than UE 410 doing so. UE 410 sends data pertaining to UE 410 and connection data to available carrier networks to home network/intelligent subscriber management server 440. Home network/intelligent subscriber management server 440 may use this information as part of the SIM switching decision process. In this example, CN 1 420 has been selected for voice and SMS and CN N 430 has been selected for data.

UE 410 configures itself to switch to CN 1 420. UE 410 requests to attach to CN 1 420 and CN N 430, and CN 1 420 and CN N 430 attach UE 410 to their respective networks. CN 1 420 and CN N 430 notify UE 410 that the attachment was successful, and UE 410 informs home network/intelligent subscriber management server 440 that the SIM switches were successful. UE 410 then uses CN 1 420 for voice and SMS and CN N 430 for data.

It should be noted that a subset of SIMs may be switched without deviating from the scope of the invention. For instance, only one of the SIMs may be switched in the examples of FIGS. 6 and 7. UE 410 may maintain the same carrier network for data but switch the carrier network for voice and SMS, or vice versa.

Figure 8A:
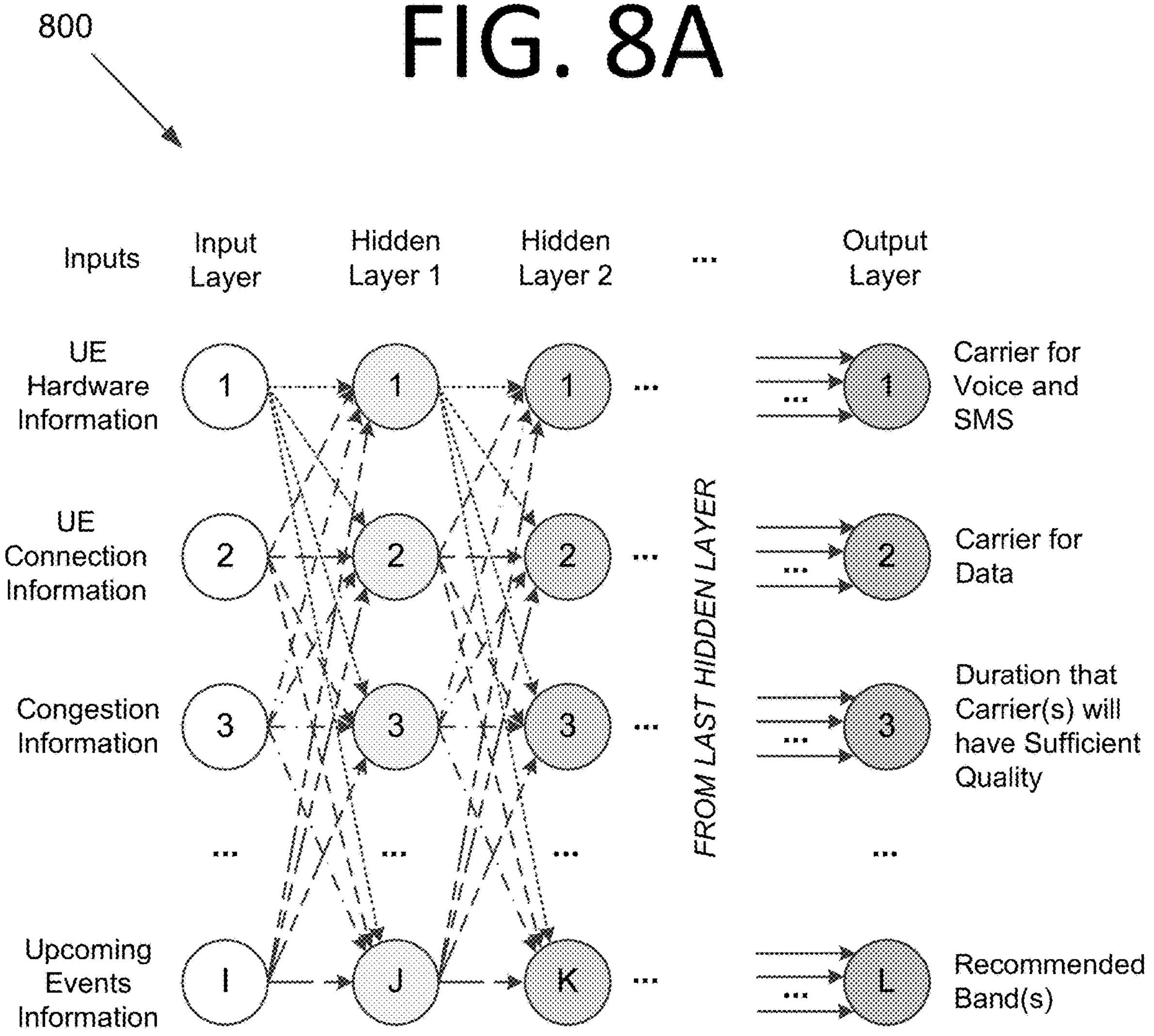
FIG. 8A illustrates an example of a neural network that has been trained to assist with intelligent SIM switching, according to an embodiment of the present invention.

Per the above, AI/ML may be used to improve the intelligent SIM switching system of some embodiments. Various types of AI/ML models may be trained and deployed without deviating from the scope of the invention. For instance, FIG. 8A illustrates an example of a neural network 800 that has been trained to suggest a carrier for voice and SMS, suggest a carrier for data, predict duration that the carrier(s) in the area will have sufficient quality for the user's subscription, recommend which band(s) to use, etc., according to an embodiment of the present invention.

Neural network 800 also includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 800.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 8A, UE hardware information, UE connection information, congestion information, information pertaining to upcoming event(s), etc. provided as the input layer are fed as inputs to the J neurons of hidden layer 1. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 800 without deviating from the scope of the invention. Indeed, in certain embodiments, the types of neurons in a given layer may not all be the same.

Neural network 800 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative co and positive co, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 8B:
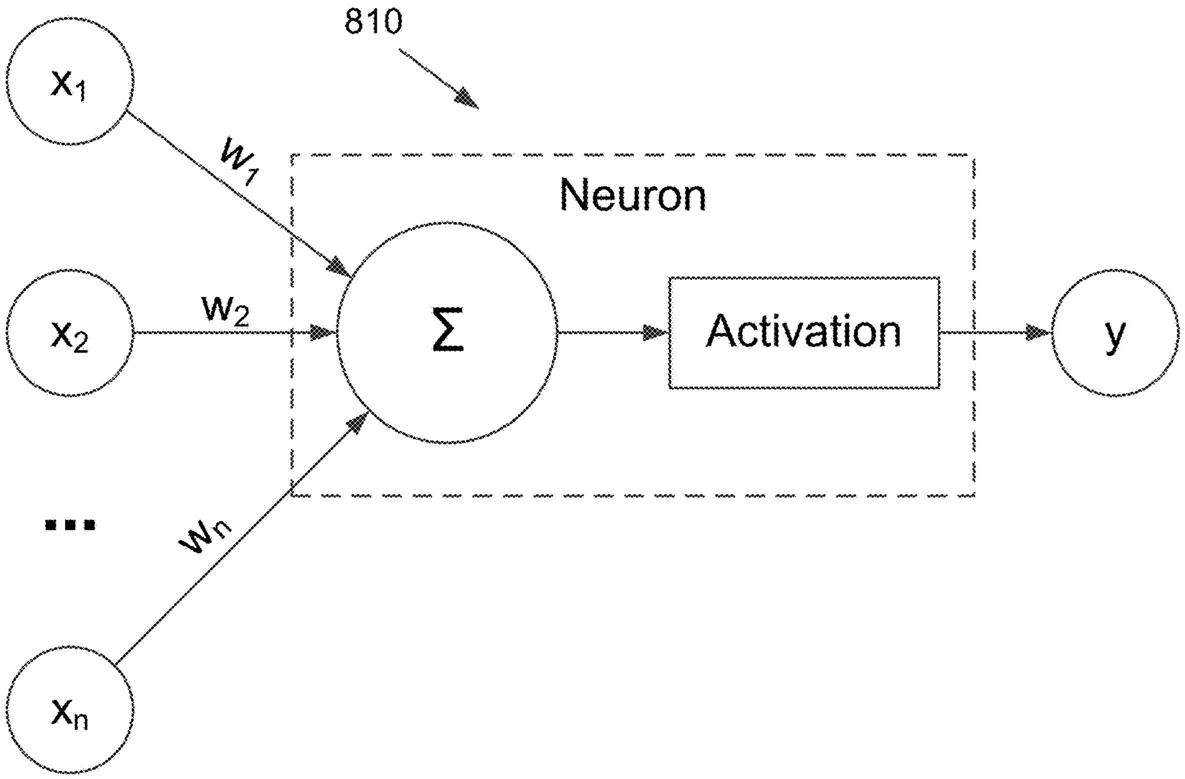
FIG. 8B illustrates an example of a neuron, according to an embodiment of the present invention.

An example of a neuron 810 is shown in FIG. 8B. Inputs $x_1, x_2, \ldots, x_n$, from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 810 may thus be given by:

$$y = f(x)\sum_{i=1}^{m}(w_i x_i) + \text{bias} \tag{3}$$

In this case, neuron 810 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the best carrier for a give service, determining a timing strategy for turning on a SIM radio in order to save power, determining when the network is likely to be congested, etc.).

During training, various labeled data is fed through neural network 800. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \dots f_1(W_1 x + b_1) \dots ) + b_{N-1}) + b_N) \qquad (4)$$

In some embodiments, o is compared with a target output t, resulting in an error $$E = 1/2\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $$p_j(n_j) = f_j'(n_j),$$

where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \qquad (5)$$

$$\frac{\partial E}{\partial W_{j+1}} = d_{j+1}(o_j)^T \qquad (6)$$

$$\frac{\partial E}{\partial b_{j+1}} = d_{j+1} \qquad (7)$$

$$W_j^{new} = W_j^{old} - \eta \frac{\partial E}{\partial W_j} \qquad (8)$$

$$b_j^{new} = b_j^{old} - \eta \frac{\partial E}{\partial b_j} \qquad (9)$$

where o denotes a Hadamard product (i.e., the element-wise product of two vectors), T denotes the matrix transpose, and $o^j$ denotes $f_j(W_j o_{j-1} + b_j)$, with $o_0 = x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to enable semantic understanding to better predict event-based congestion or service interruptions due to an accident, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, Open AI, etc. may be used in some embodiments to facilitate semantic understanding. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DB SCAN clustering algorithm, the Gaussian mixture model (GMM) algorithms, the balance iterative reducing and clustering using hierarchies (BIRCH) algorithm, etc. Such techniques may also assist with categorization.

Figure 9:
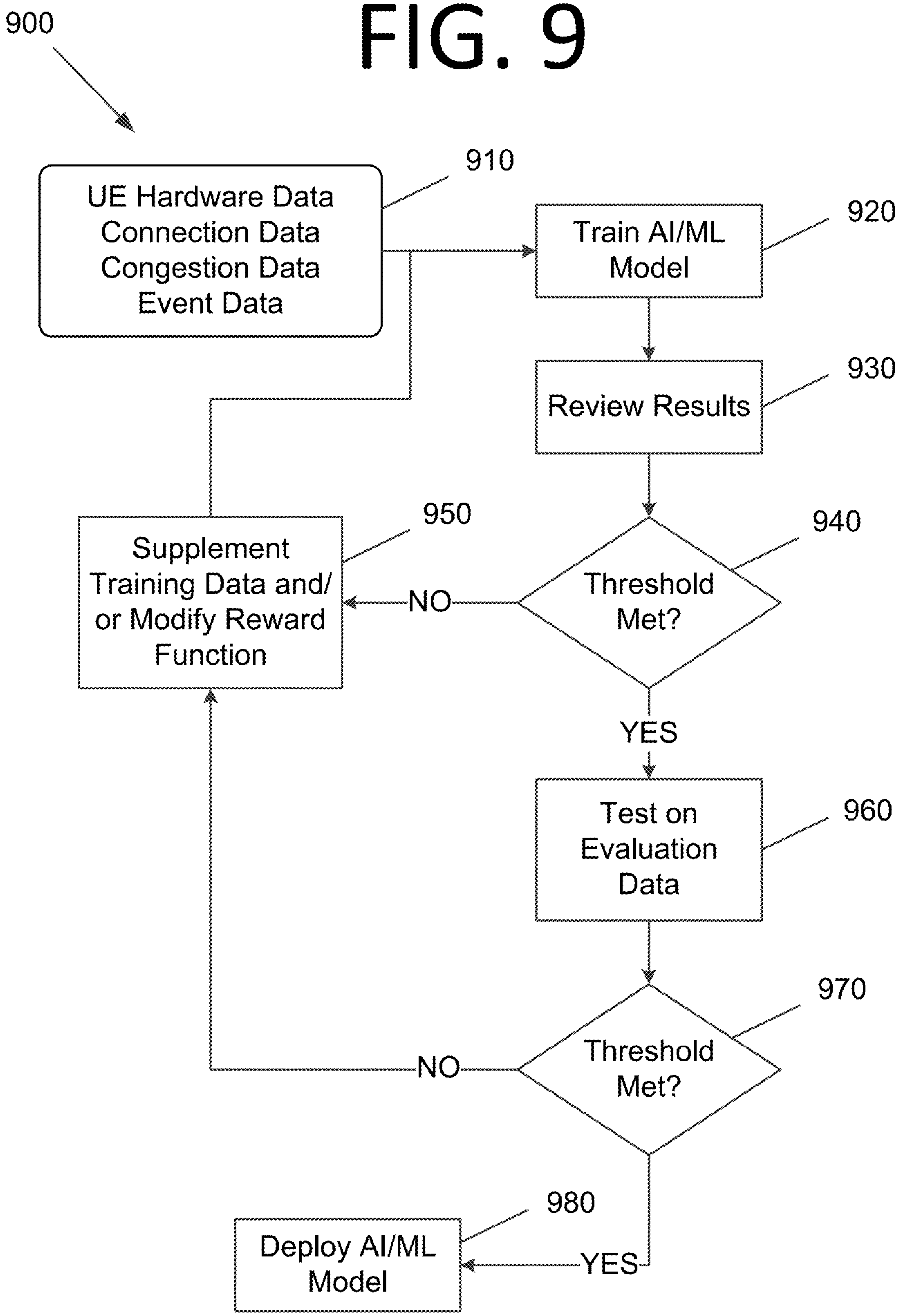
FIG. 9 is a flowchart illustrating a process for training AI/ML model(s), according to an embodiment of the present invention.

FIG. 9 is a flowchart illustrating a process 900 for training AI/ML model(s), according to an embodiment of the present invention. The process begins with providing UE hardware data, connection data, congestion data, event data, etc. at 910, whether labeled or unlabeled. Other training data used in addition to or in lieu of the training data shown in FIG. 9 may include, but is not limited to, available networks at the location, customer rate plans that determine the quality of service and thus impact the network that is selected, etc. Indeed, the nature of the training data that is provided will depend on the objective that the AI/ML model is intended to achieve. The AI/ML model is then trained over multiple epochs at 920 and results are reviewed at 930.

If the AI/ML model fails to meet a desired confidence threshold at 940, the training data is supplemented and/or the reward function is modified to help the AI/ML model achieve its objectives better at 950 and the process returns to step 920. If the AI/ML model meets the confidence threshold at 940, the AI/ML model is tested on evaluation data at 960 to ensure that the AI/ML model generalizes well and that the AI/ML model is not over fit with respect to the training data. The evaluation data includes information that the AI/ML model has not processed before. If the confidence threshold is met at 970 for the evaluation data, the AI/ML model is deployed at 980. If not, the process returns to step 950 and the AI/ML model is trained further.

Figure 10:
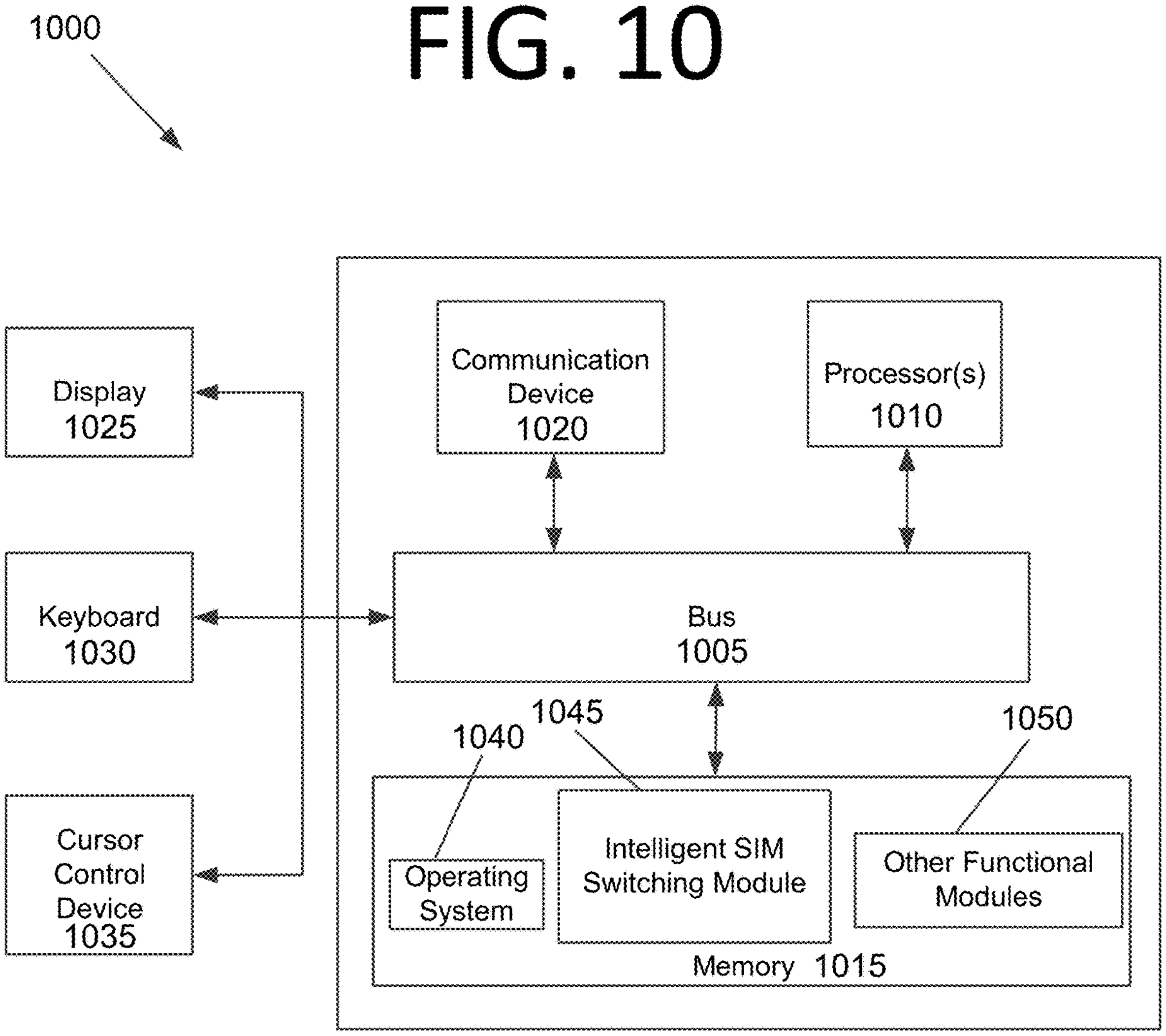
FIG. 10 is an architectural diagram illustrating a computing system configured to intelligent SIM switching or aspects thereof, according to an embodiment of the present invention.

FIG. 10 is an architectural diagram illustrating a computing system 1000 configured to perform intelligent SIM switching or aspects thereof, according to an embodiment of the present invention. In some embodiments, computing system 1000 may be one or more of the computing systems depicted and/or described herein, such as UE, a carrier server, a computing system of a RAN, etc. Computing system 1000 includes a bus 1005 or other communication mechanism for communicating information, and processor(s) 1010 coupled to bus 1005 for processing information. Processor(s) 1010 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1010 may also have multiple processing cores, and at least some of the cores may be configured to perform specific functions. Multi-parallel processing may be used in some embodiments. In certain embodiments, at least one of processor(s) 1010 may be a neuromorphic circuit that includes processing elements that mimic biological neurons. In some embodiments, neuromorphic circuits may not require the typical components of a Von Neumann computing architecture.

Computing system 1000 further includes a memory 1015 for storing information and instructions to be executed by processor(s) 1010. Memory 1015 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1010 and may include volatile media, non-volatile media, or both. The media may also be removable, non-removable, or both.

Additionally, computing system 1000 includes a communication device 1020, such as a transceiver, to provide access to a communications network via a wireless and/or wired connection. In some embodiments, communication device 1020 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1020 may include one or more antennas that are singular, arrayed, phased, switched, beamforming, beamsteering, a combination thereof, and or any other antenna configuration without deviating from the scope of the invention.

Processor(s) 1010 are further coupled via bus 1005 to a display 1025, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1025 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1030 and a cursor control device 1035, such as a computer mouse, a touchpad, etc., are further coupled to bus 1005 to enable a user to interface with computing system 1000. However, in certain embodiments, a physical keyboard and mouse may not be present, and the user may interact with the device solely through display 1025 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1015 stores software modules that provide functionality when executed by processor(s) 1010. The modules include an operating system 1040 for computing system 1000. The modules further include an intelligent SIM switching module 1045 that is configured to perform all or part of the processes described herein or derivatives thereof. Computing system 1000 may include one or more additional functional modules 1050 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 11:
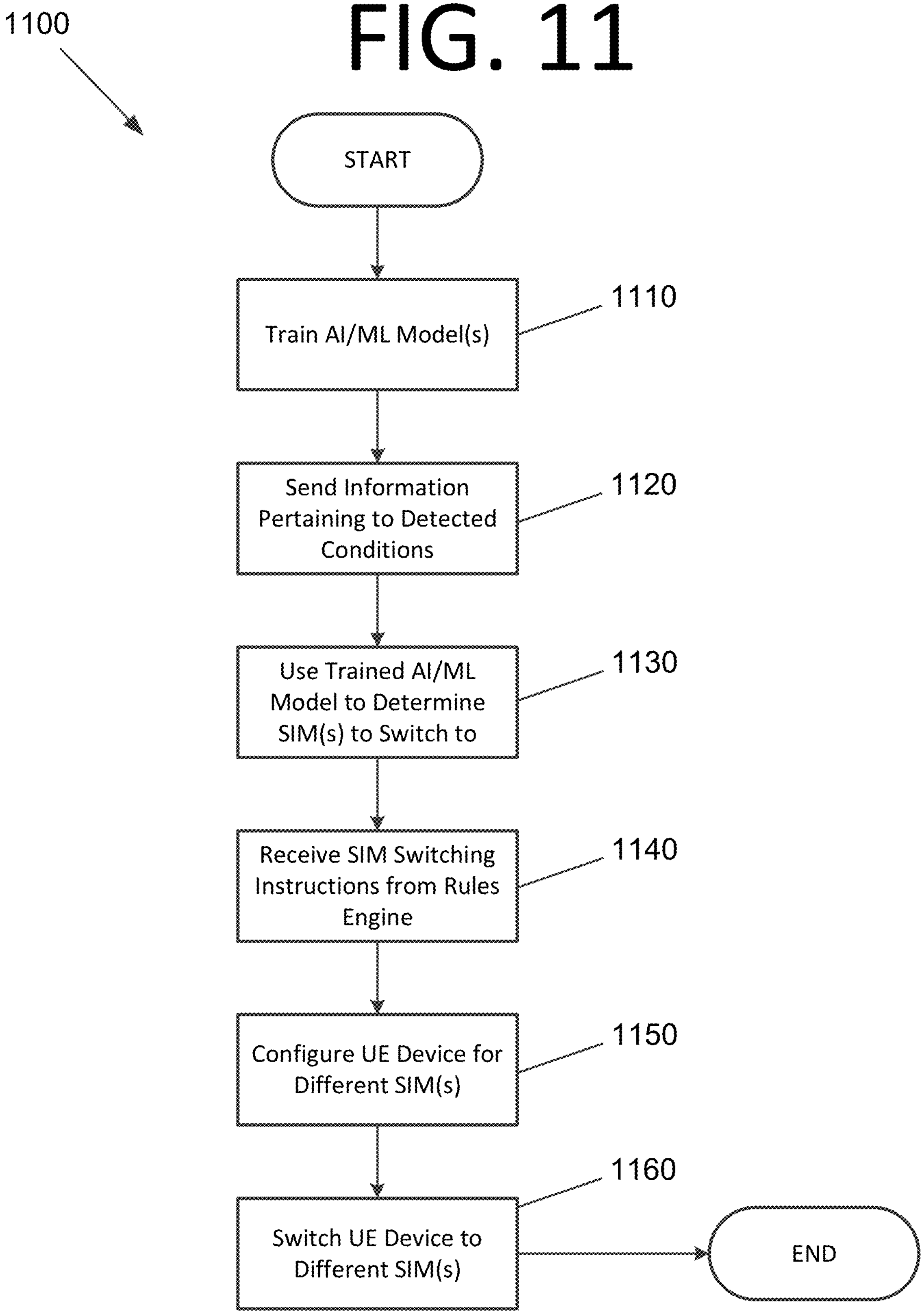
FIG. 11 is a flowchart illustrating a process for intelligent SIM switching, according to an embodiment of the present invention.

FIG. 11 is a flowchart illustrating a process 1100 for intelligent SIM switching, according to an embodiment of the present invention. In some embodiments, the process begins with training an AI/ML model for intelligent SIM switching to assist in determining the SIM or SIM profile (e.g., in the case of a virtual SIM, where one SIM may be used for multiple carriers) of the plurality of SIMs or SIM profiles to switch to at 1110. The AI/ML model is trained using hardware information from a plurality of UE devices, connection information from a plurality of UE devices, network congestion information, information pertaining to upcoming events, or any combination thereof. In certain embodiments, the UE device sends information pertaining to conditions detected by the UE device to the home network of the UE device at 1120. The rules engine may be configured to use the information pertaining to the conditions detected by the UE device to determine which SIM(s) or SIM profile(s) from the plurality of SIMs or SIM profiles to switch to. In some embodiments, the trained AI/ML model for intelligent SIM switching is used by a rules engine to assist in determining the SIM or SIM profile of the plurality of SIMs or SIM profiles to switch to at 1130.

The UE device receives instructions from the rules engine (e.g., of the UE device or of a home network of the UE device) to switch from the current SIM or SIM profile to a different SIM or SIM profile at 1140. In some embodiments, the instructions may include more than one SIM (e.g., one SIM for voice and SMS and another SIM for data). The rules engine is configured to determine which SIM(s) or SIM profile(s) from a plurality of SIMs or SIM profiles that the UE device should switch to in accordance with the policy. Responsive to the instructions from the rules engine, the UE device configures itself for the different SIM(s) or SIM profile(s) and associated carrier(s) at 1150. The UE device is then switched to the other SIM(s) or SIM profile(s) for communications services provided by the associated carrier(s) at 1160.

In some embodiments, the rules engine is configured to take into account a location of the UE device, hardware capabilities of the UE device, compatibility of the UE device with carrier networks associated with the plurality of SIMs or SIM profiles, services that the UE device is configured to use, carrier networks that are available in a location of the UE device, network quality criteria, subscription criteria, cost criteria, or any combination thereof, when determining which SIM or SIM profile from the plurality of SIMs or SIM profiles to switch to. In certain embodiments, the rules engine selects a SIM or SIM profile of the plurality of SIMs or SIM profiles with a lowest cost available carrier network that meets minimum quality criteria or a highest quality according to quality criteria. In some embodiments, the policy is a tiered policy comprising a carrier network preference order based on location or a preference for different carrier networks for different services. In certain embodiments, the policy is reactive and the rules engine is configured to cause the UE to switch to the different SIM or SIM profile based on a drop in signal strength below a minimum threshold, detection that a RAN for a carrier of the current SIM or SIM profile has gone down, a change in a location of the UE, detection that an antenna of the UE is no longer working such that a band can no longer be used, or any combination thereof.

In some embodiments, the policy is predictive and uses deterministic logic based on observations over time, probabilistic logic of one or more AI/ML models, or both. In certain embodiments, the rules engine is configured to determine the policy based on one or more artificial AI/ML models. In some embodiments, the rules engine is configured to analyze network loading and congestion, subscription information, carrier contract information, or any combination thereof, to determine which SIM(s) or SIM profile(s) from the plurality of SIMs or SIM profiles to switch to.

The process steps performed in FIGS. 3-7 and 11 may be performed by computer program(s), encoding instructions for the processor(s) to perform at least part of the process(es) described in FIGS. 3-7 and 11, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1010 of computing system 1000 of FIG. 10) to implement all or part of the process steps described in FIGS. 3-7 and 11, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An intelligent subscriber management server, comprising:

memory storing computer program instructions configured to facilitate roaming intelligent subscriber identity module (SIM) switching for a plurality of user equipment (UE) devices; and at least one processor configured to execute the computer program instructions, wherein the computer program instructions are configured to cause the at least one processor to:

monitor traffic from the plurality of UE devices routed through home network infrastructure via a radio access network (RAN) of the home network infrastructure, or routed through the home network infrastructure from carrier network infrastructure of another carrier;

select a SIM or SIM profile with a lowest cost available carrier network, from among a plurality of carrier networks, that meets minimum quality criteria or a highest quality according to the quality criteria, wherein the quality criteria are related to one or more of: signal-to-noise ratio (SNR) and signal to interference and noise ratio (SINR);

determine that a UE device of the plurality of UE devices should switch from a current SIM or SIM profile to a different SIM or SIM profile in accordance with a policy based on the selection, the policy comprising a weighted policy rule that applies a variable weight to at least one of the SNR or the SINR, wherein features of the weighted policy rule comprise at least one of:

the variable weight varies according to at least one of a linear, exponential, or step function based on the at least one of the SNR or the SINR; or the variable weight is updated using backpropagation; and instruct the UE device of the plurality of UE devices to switch to the different SIM or SIM profile.

2. The intelligent subscriber management server of claim 1, wherein the computer program instructions are configured to take into account at least one of locations of the plurality of UE devices, hardware capabilities of the plurality of UE devices, compatibility of the plurality of UE devices with carrier networks associated with a plurality of SIMs or SIM profiles, services that the plurality of UE devices are configured to use, carrier networks that are available in respective locations of the plurality of UE devices, the quality criteria, subscription criteria, or cost criteria, when determining which SIM or SIM profile to switch to.

3. The intelligent subscriber management server of claim 1, wherein the policy is a tiered policy comprising a carrier network preference order based on location or a preference for different carrier networks for different services.

4. The intelligent subscriber management server of claim 1, wherein the policy is reactive and the computer program instructions are configured to cause the UE device of the plurality of UE devices to switch to the different SIM or SIM profile based on at least one of a drop in signal strength below a minimum threshold, detection that a RAN for a carrier of the current SIM or SIM profile has gone down, a change in a location of the UE device, or detection that an antenna of the UE device is no longer working such that a band can no longer be used.

5. The intelligent subscriber management server of claim 1, wherein the policy is predictive and uses deterministic logic based on observations over time, probabilistic logic of one or more artificial intelligence (AI)/machine learning (ML) models, or both.

6. The intelligent subscriber management server of claim 1, wherein the computer program instructions are configured to determine the policy based on one or more artificial intelligence (AI)/machine learning (ML) models.

7. The intelligent subscriber management server of claim 1, wherein the computer program instructions are further configured to cause the at least one processor to:

receive information pertaining to conditions detected by the plurality of UE devices; and use the received information at least in part for determining that the UE device should switch to the different SIM or SIM profile.

8. The intelligent subscriber management server of claim 1, wherein the computer program instructions are configured to analyze at least one of network loading and congestion, subscription information, or carrier contract information, to determine which SIM or SIM profile to switch to.

9. The intelligent subscriber management server of claim 1, wherein the different SIM or SIM profile is for a first service, the instructions to switch to the different SIM or SIM profile comprise selection of another different SIM or SIM profile for a second service, and the first service comprises voice and short message service (SMS) and the second service comprises data, or vice versa.

10. The intelligent subscriber management server of claim 1, wherein the computer program instructions are further configured to cause the at least one processor to:

use a trained AI/ML model for intelligent SIM switching to assist in determining the SIM or SIM profile to switch to, wherein the trained AI/ML model is trained using at least one of hardware information from UE devices, connection information from the UE devices, network congestion information, or information pertaining to upcoming events.

11. A computer-implemented method for facilitating roaming intelligent subscriber identity module (SIM) switching for a plurality of user equipment (UE) devices, comprising:

monitoring, by an intelligent subscriber management server, traffic from the plurality of UE devices routed through home network infrastructure via a radio access network (RAN) of the home network infrastructure, or routed through the home network infrastructure from carrier network infrastructure of another carrier;

selecting, by the intelligent subscriber management server, a SIM or SIM profile with a lowest cost available carrier network, from among a plurality of carrier networks, that meets minimum quality criteria or a highest quality according to quality criteria, wherein the quality criteria are related to one or more of: a minimum signal strength, signal-to-noise ratio (SNR) and signal to interference and noise ratio (SINR);

determining, by the intelligent subscriber management server, that a UE device of the plurality of UE devices should switch from a current SIM or SIM profile to a different SIM or SIM profile in accordance with a policy based on the selection, the policy comprising a weighted policy rule that applies a variable weight to at least one of the SNR or the SINR, wherein features of the weighted policy rule comprise at least one of:

the variable weight varies according to at least one of a linear, exponential, or step function based on the at least one of the SNR or the SINR; or the variable weight is updated using backpropagation; and instructing the UE device of the plurality of UE devices to switch to the different SIM or SIM profile, by the intelligent subscriber management server.

12. The computer-implemented method of claim 11, wherein the intelligent subscriber management server is configured to take into account at least one of locations of the plurality of UE devices, hardware capabilities of the plurality of UE devices, compatibility of the plurality of UE devices with carrier networks associated with a plurality of SIMs or SIM profiles, services that the plurality of UE devices are configured to use, carrier networks that are available in respective locations of the plurality of UE devices, network quality criteria, subscription criteria, or cost criteria, when determining which SIM or SIM profile to switch to.

13. The computer-implemented method of claim 11, wherein the policy is reactive and the intelligent subscriber management server is configured to cause the UE device of the plurality of UE devices to switch to the different SIM or SIM profile based on at least one of a drop in signal strength below a minimum threshold, detection that a RAN for a carrier of the current SIM or SIM profile has gone down, a change in a location of the UE device, or detection that an antenna of the UE device is no longer working such that a band can no longer be used.

14. The computer-implemented method of claim 11, wherein the policy is predictive and uses deterministic logic based on at least one of observations over time or probabilistic logic of one or more artificial intelligence (AI)/machine learning (ML) models, and the intelligent subscriber management model is configured to determine the policy based on the one or more AI/ML models.

15. The computer-implemented method of claim 11, wherein the computer program instructions are configured to analyze at least one of network loading and congestion, subscription information, or carrier contract information, to determine which SIM or SIM profile to switch to.

16. The computer-implemented method of claim 11, wherein the different SIM or SIM profile is for a first service, the instructions to switch to the different SIM or SIM profile comprise selection of another different SIM or SIM profile for a second service, and the first service comprises voice and short message service (SMS) and the second service comprises data, or vice versa.

17. A non-transitory computer-readable medium storing a computer program for facilitating roaming intelligent subscriber identity module (SIM) switching for a plurality of user equipment (UE) devices, the computer program configured to cause at least one processor to:

monitor traffic from the plurality of UE devices routed through home network infrastructure via a radio access network (RAN) of the home network infrastructure, or routed through the home network infrastructure from carrier network infrastructure of another carrier;

select a SIM or SIM profile with a lowest cost available carrier network, from among a plurality of carrier networks, that meets minimum quality criteria or a highest quality according to the quality criteria, wherein the quality criteria are related to one or more of: signal-to-noise ratio (SNR) and signal to interference and noise ratio (SINR);

determine that a UE device of the plurality of UE devices should switch from a current SIM or SIM profile to a different SIM or SIM profile in accordance with a policy based on the selection, the policy comprising a weighted policy rule that applies a variable weight to at least one of the SNR or the SINR, wherein features of the weighted policy rule comprise at least one of:

the variable weight varies according to at least one of a linear, exponential, or step function based on the at least one of the SNR or the SINR; or the variable weight is updated using backpropagation; and instruct the UE device of the plurality of UE devices to switch to the different SIM or SIM profile.

18. The non-transitory computer-readable medium of claim 17, wherein the determination that the UE device of the plurality of UE devices should switch from the current SIM or SIM profile to the different SIM or SIM profile further comprises taking into account at least one of locations of the plurality of UE devices, hardware capabilities of the plurality of UE devices, compatibility of the plurality of UE devices with carrier networks associated with a plurality of SIMs or SIM profiles, services that the plurality of UE devices are configured to use, carrier networks that are available in respective locations of the plurality of UE devices, network quality criteria, subscription criteria, or cost criteria.

19. The non-transitory computer-readable medium of claim 17, wherein the policy is predictive and uses deterministic logic based on at least one of observations over time or probabilistic logic of one or more artificial intelligence (AI)/machine learning (ML) models.

20. The non-transitory computer-readable medium of claim 19, wherein the computer program is configured to determine the policy based on the one or more AI/ML models.

* * * * *